US010183560B2

(12) United States Patent
Sullivan

(10) Patent No.: US 10,183,560 B2
(45) Date of Patent: Jan. 22, 2019

(54) SYSTEMS AND METHODS FOR A TRUCK BOX COVER

(71) Applicant: Michael J. Sullivan, Oconomowoc, WI (US)

(72) Inventor: Michael J. Sullivan, Oconomowoc, WI (US)

( * ) Notice: Subject to any disclaimer, the term of this patent is extended or adjusted under 35 U.S.C. 154(b) by 0 days.

(21) Appl. No.: 15/850,449

(22) Filed: Dec. 21, 2017

(65) Prior Publication Data
US 2018/0339578 A1 Nov. 29, 2018

Related U.S. Application Data

(63) Continuation of application No. 15/602,191, filed on May 23, 2017, now Pat. No. 9,849,763.

(51) Int. Cl.
| B60J 7/12 | (2006.01) |
| B60R 9/00 | (2006.01) |
| B60J 7/185 | (2006.01) |
| B60J 7/08 | (2006.01) |
| B62D 33/04 | (2006.01) |

(52) U.S. Cl.
CPC ............... B60J 7/12 (2013.01); B60J 7/085 (2013.01); B60J 7/185 (2013.01); B60R 9/00 (2013.01); *B62D 33/04* (2013.01)

(58) Field of Classification Search
CPC .... B60J 7/12; B60J 7/085; B60J 7/185; B60R 9/00; B60P 3/34
USPC .............. 296/3, 26.04, 26.05, 165, 171, 173
See application file for complete search history.

(56) References Cited

U.S. PATENT DOCUMENTS

| 4,284,303 A | 8/1981 | Hather |
| 5,238,288 A | 8/1993 | Chandler |
| 5,366,266 A | 11/1994 | Harbison |
| 5,516,182 A | 5/1996 | Aragon et al. |
| 5,758,921 A | 6/1998 | Hall |
| 6,830,281 B2 | 12/2004 | Hoffman |
| 7,118,159 B1 | 10/2006 | Andrews |
| 7,118,165 B2 | 10/2006 | Nelson et al. |
| 7,147,265 B1 | 12/2006 | Schmeichel |
| 7,226,108 B2 | 6/2007 | Altman |
| 7,419,207 B2 | 9/2008 | Klein |
| 7,735,898 B1 | 6/2010 | Bridges |
| 7,758,103 B1 | 7/2010 | Steury et al. |
| 7,959,200 B2 | 6/2011 | Voglmayr |
| 8,186,739 B2 | 5/2012 | Bruestle et al. |
| 8,308,218 B2 | 11/2012 | Kneifl et al. |
| 8,684,439 B1 | 4/2014 | Calvert |
| 9,475,371 B2 | 10/2016 | LaBiche |
| 2005/0093339 A1 | 5/2005 | Klassen |
| 2006/0017303 A1 | 1/2006 | Weege et al. |
| 2008/0174142 A1 | 7/2008 | Pearlman |
| 2009/0189403 A1 | 7/2009 | Voglmayr |
| 2011/0309651 A1 | 12/2011 | Hernandez et al. |

(Continued)

OTHER PUBLICATIONS

Office Action dated Aug. 2, 2017, U.S. Appl. No. 15/602,191, filed May 23, 2017.

*Primary Examiner* — Joseph D. Pape
(74) *Attorney, Agent, or Firm* — Smith Keane LLP

(57) ABSTRACT

Systems for a truck box cover and more particularly to a truck box cover system configured to transform to suit multiple load types and still protect the load from outside elements. The truck box cover system has a plurality of electrically controlled telescoping columns and sides made of compliant material for raising and lowering the cover and maintaining a closed configuration.

11 Claims, 24 Drawing Sheets

(56) References Cited

U.S. PATENT DOCUMENTS

2016/0243975 A1    8/2016   Singer
2016/0280051 A1    9/2016   Singer

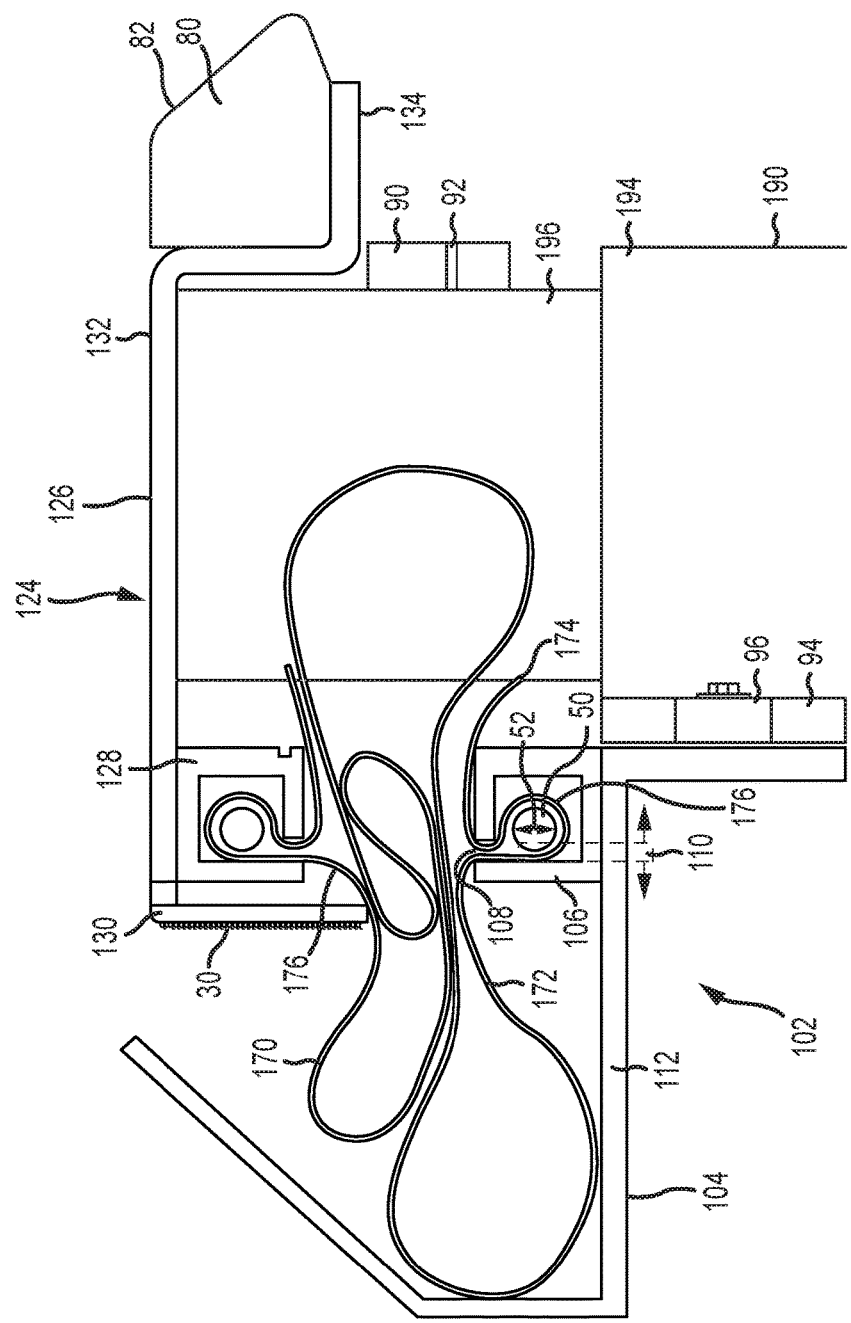

SYSTEMS AND METHODS FOR A TRUCK BOX COVER

RELATED APPLICATIONS

This application is a continuation of co-pending U.S. patent application Ser. No. 15/602,191, filed 23 May 2017, titled, "Systems and Methods for a Truck Box Cover," which is incorporated herein in its entirety.

BACKGROUND OF THE INVENTION

Pick-up trucks are typically produced with a cargo box having an open design with a tailgate which may be lowered or opened in some manner to allow access to the cargo box. Presently, there are many options and styles provided through the aftermarket to cover the open box to keep contents placed in the box out of the weather, more secure, or just to provide a more pleasing aesthetic. Varieties of box covers include both soft and hard tonneau covers and paneled tonneau covers which extend across the top of the box at the height of the box rails, and caps (or toppers) which sit on top of the box rails and extend over the box at a height of at least the height of the truck cab. Although some soft and paneled covers offer the ability to roll or remove the cover material entirely, the intended utility of the cover is typically limited to the dimensions defined by the cover itself.

Therefore, there is a need for a box cover that can transform to suit multiple load types and still protect the load from outside elements.

SUMMARY OF THE INVENTION

The present invention relates to a truck box cover system (i.e., a tonneau cover, topper, cap, etc.), and more particularly to a truck box cover system configured to transform to suit multiple load types and still protect the load from outside elements. The truck box cover system preferably raises and lowers and has pliable sides to maintain a closed configuration in all states. The truck box cover system is more preferably directed to a weatherproof soft tonneau cover that is convertible into a weatherproof cap with a soft top and sides.

One aspect of the present invention is directed to a truck box cover system comprising a first frame comprising a first rail member enclosure and a second rail member enclosure; a second frame; a plurality of telescopic assemblies operatively connected to the first frame and the second frame, and configured to move the second frame relative to the first frame between a first position and a second position; a top supported by the second frame; and a compliant material supported by and extending from the first frame to the second frame; whereby in the first position the first frame and the second frame are juxtaposed and the compliant member is substantially retained within the first rail member enclosure and the second rail member enclosure; and whereby in the second position the first frame and the second frame are spaced apart and the compliant member defines a first wall, a second wall, and a third wall. The first frame may be attached to a truck box. The plurality of telescopic assemblies may be configured to be operated electrically and may be configured to be operated remotely.

Additionally, or alternatively, the compliant member may be weatherproof material and may be a stretch tent textile.

Another aspect of the present invention is to provide a truck box cover system comprising a top movable between a first position and a second position; a first rail member enclosure; a second rail member enclosure; a plurality of telescopic assemblies operatively connected to the top and configured to move the top between the first position and the second position; and a compliant material extending between the top and the first and second rail member enclosures; the compliant material substantially retained within the first and second rail member enclosures in the first position; and the compliant member defining a first wall, a second wall, and a third wall in the second position. The plurality of telescopic assemblies may be configured to be operated electrically and may be configured to be operated remotely.

Additionally, or alternatively, the compliant member may be weatherproof material and may be a stretch tent textile.

BRIEF DESCRIPTION OF THE DRAWINGS

FIG. 5A is an end elevation view of a rail member and a cover member of the first embodiment system according to the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
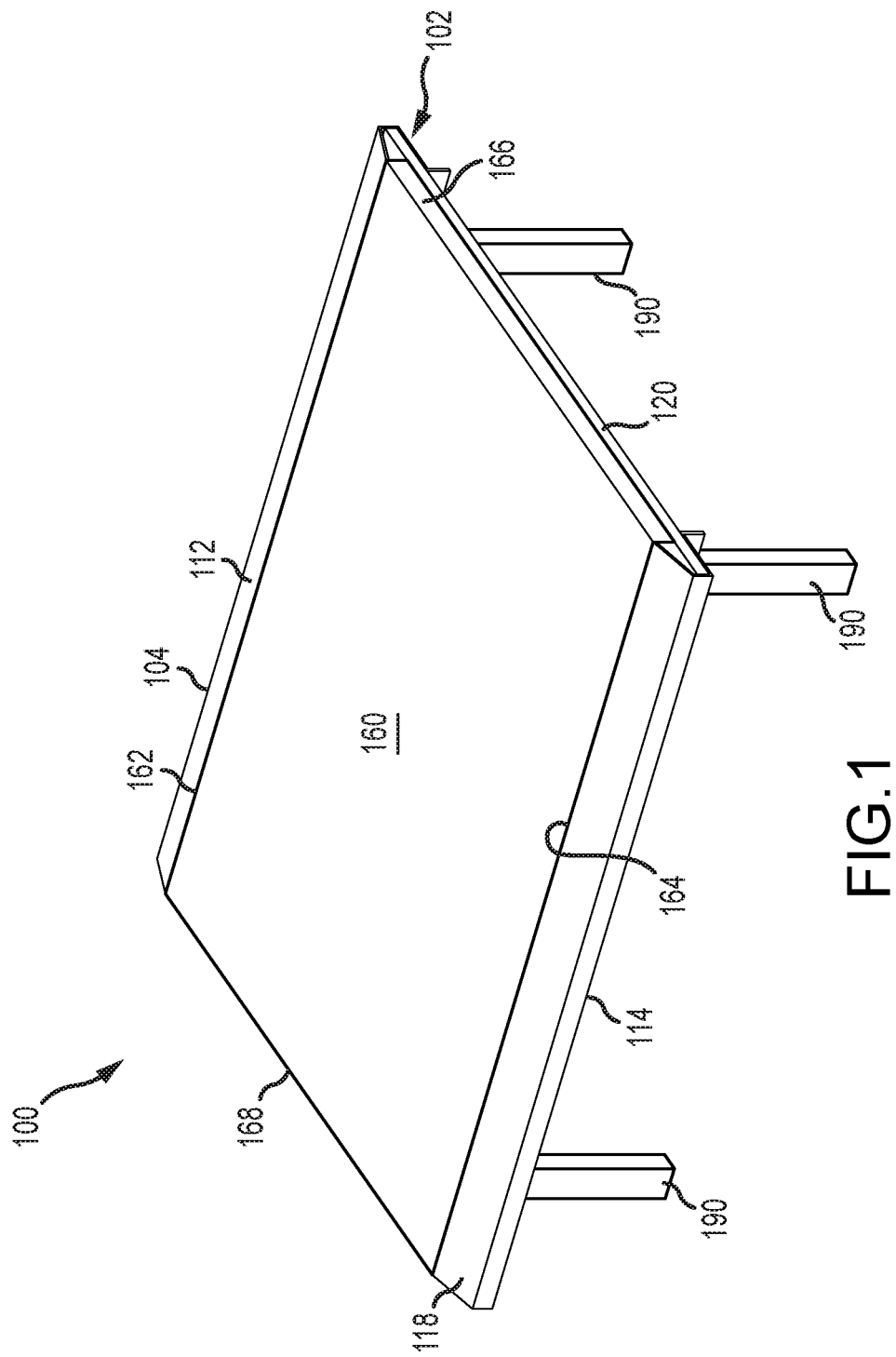
FIG. 1 is a front perspective view of first embodiment of a truck box cover system in a first position according to the present invention.
Figure 2:
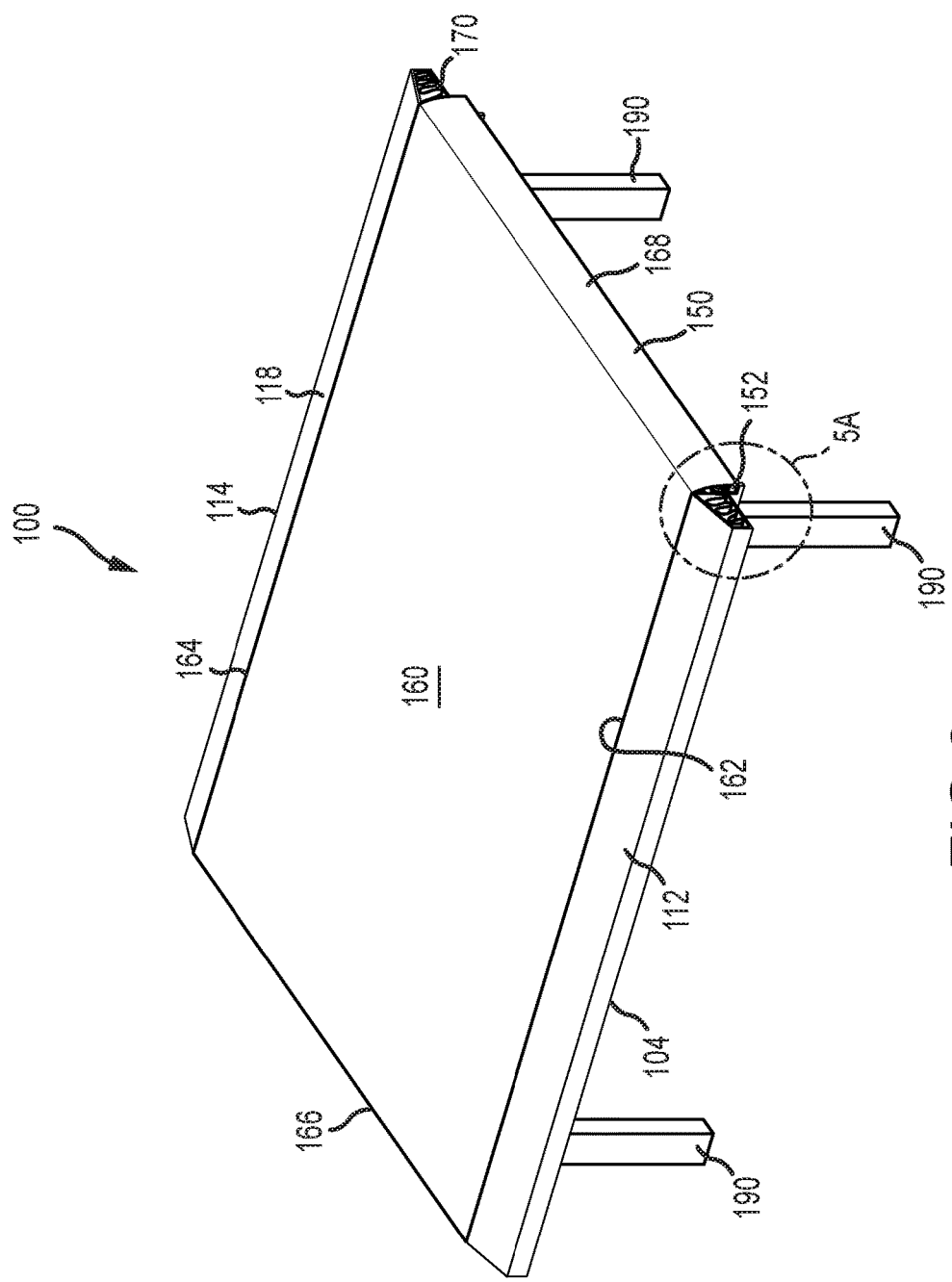
FIG. 2 is a rear perspective view of the first embodiment system in the first position according to the present invention.
Figure 3:
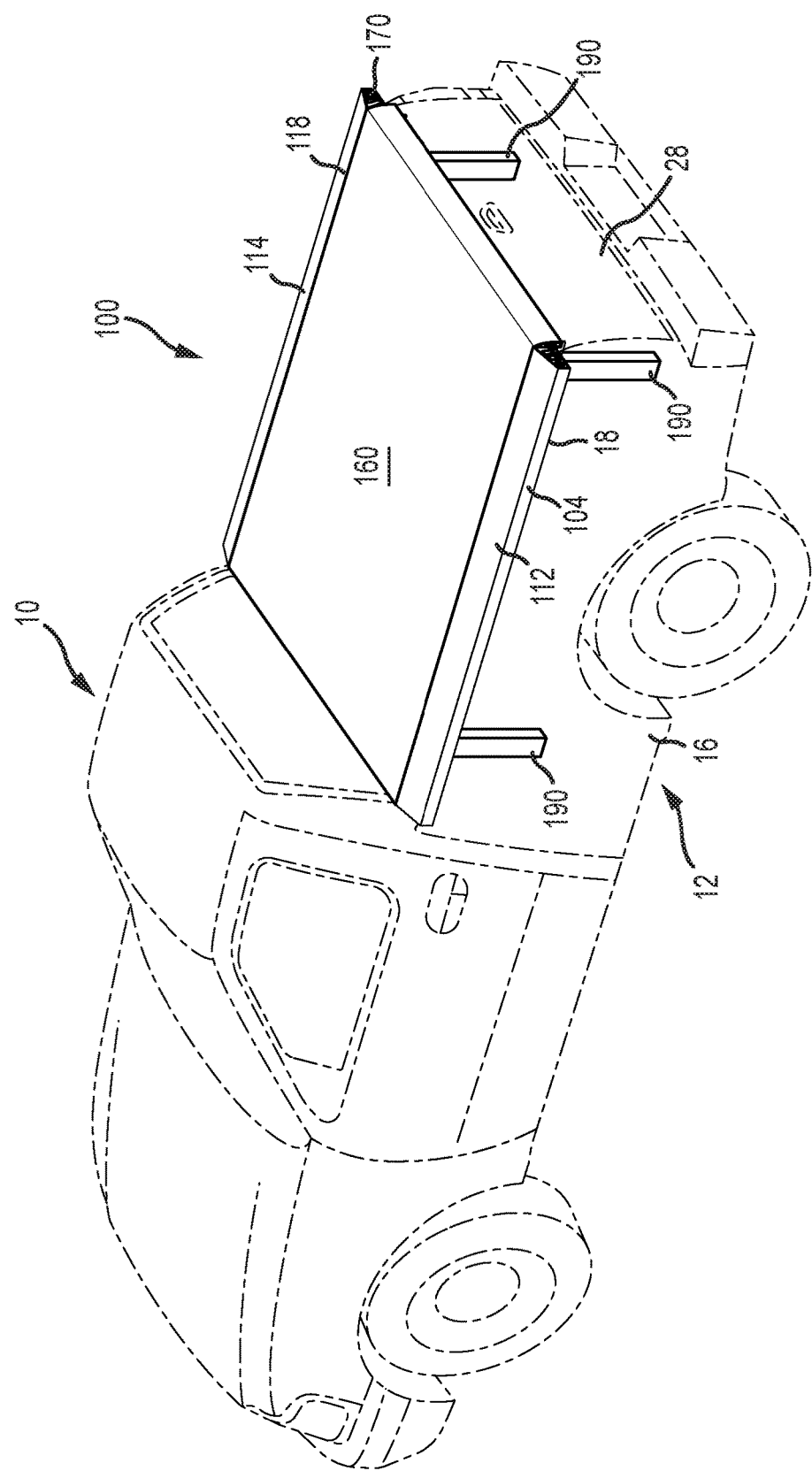
FIG. 3 is a perspective view of the first embodiment system in the first position installed in the box of a truck according to the present invention.
Figure 10:
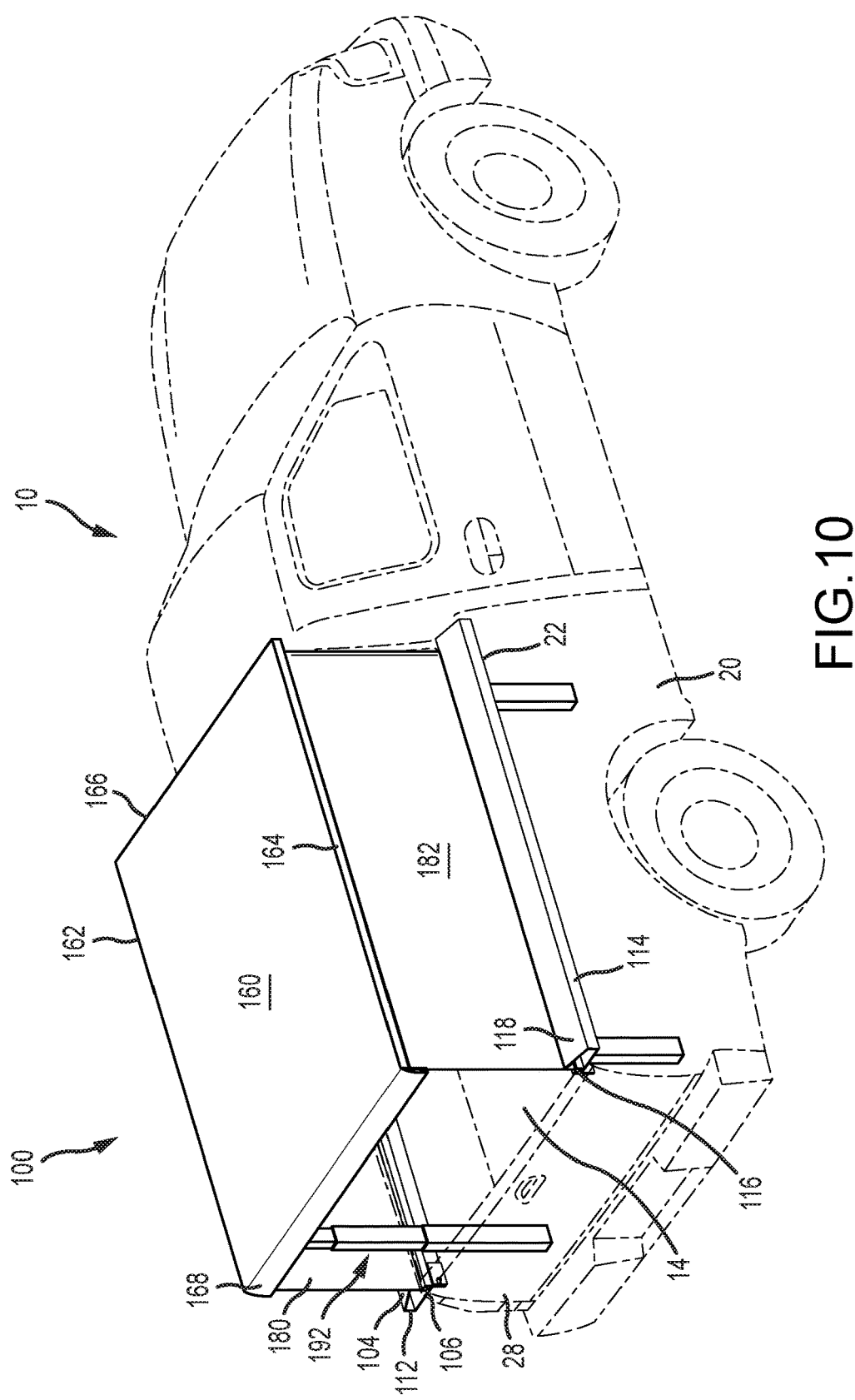
FIG. 10 is a rear perspective view of the first embodiment system in the second position installed in the box of the truck according to the present invention.

FIGS. 1-3 illustrate a first exemplary embodiment 100 of a truck box cover according to the present invention in a first position both independently and as installed in the box 12 of a truck 10. The box 12 of a truck 10 typically comprises a box floor 14, a first body panel 16 with a first box rail 18, a second body panel 20 with a second box rail 22, a box end panel 24 with a third box rail 26, and a tailgate 28 (see also FIGS. 10 and 11).

The truck box cover system 100 according to an exemplary first embodiment of the present invention preferably comprises a first frame 102; a second frame 124; a top 160 preferably comprising a first compliant material; a second compliant material 170 (see also FIG. 6), a rear panel 70, and a plurality of columns 190.

The first frame 102 preferably comprises a first rail member 104, a second rail member 114, and a third rail member 120. The first, second, and third rail members 104,114,120 are configured to follow the shape of the truck box 12, specifically the first, second, and third box rails 18,22,26, respectively.

The first, second, and third rail members 104,114,120 are preferably configured to be set upon the first, second, and third box rails 18,22,26 of the box 12, respectively. Securing at least the first and second rail members 104,114, to the first and second box rails 18,22 may be accomplished by clamping, bolting, and/or any other method now known or later developed.

Looking at FIG. 5A the first rail member 104 is shown in more detail. Preferably, the first rail member 104 comprises a first rail member retainer 106 and a first rail member enclosure 112. Similarly, but not shown in this figure, the second rail member 114 preferably comprises a second rail member retainer 116 and a second rail member enclosure 118. As discussed further below, the first and second rail member retainers 106,116 are configured to retain a first end portion 172 of the second compliant member 170, and the first and second rail member enclosures 112,118 are configured to house at least a portion of the second compliant material 170 when the truck box cover system 100 is in the first position (see FIG. 5).

Looking back to FIG. 1, the third rail member 120 is shown preferably comprising a third rail member retainer 122, similar to the first and second rail member retainers 106, 116. The third rail member 120 extends between the first and second rail members 104,114 and is configured to retain the first end portion 172 of the second compliant member 170.

Figure 5B:
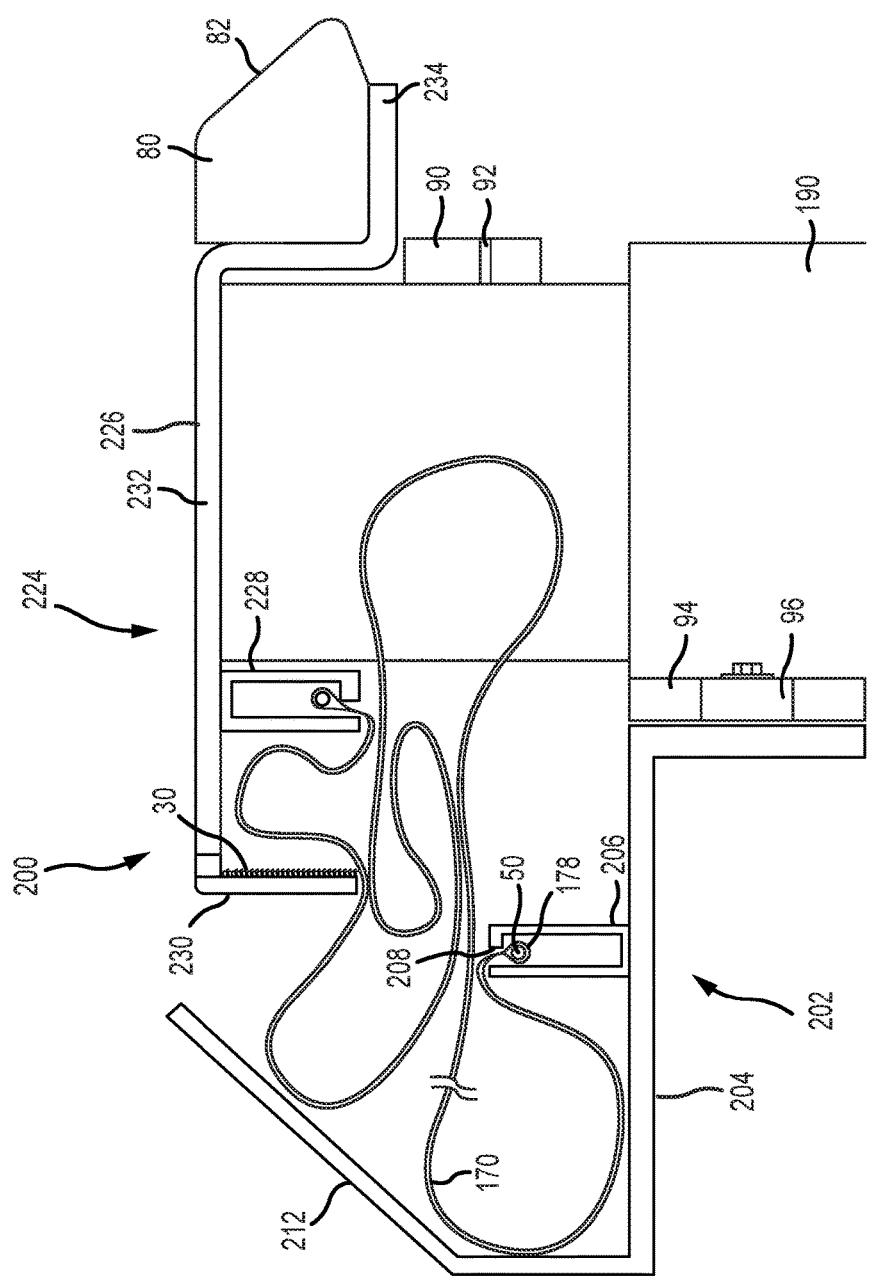
FIG. 5B is an end elevation view of a rail member and a cover member of a second embodiment system according to the present invention.
Figure 6:
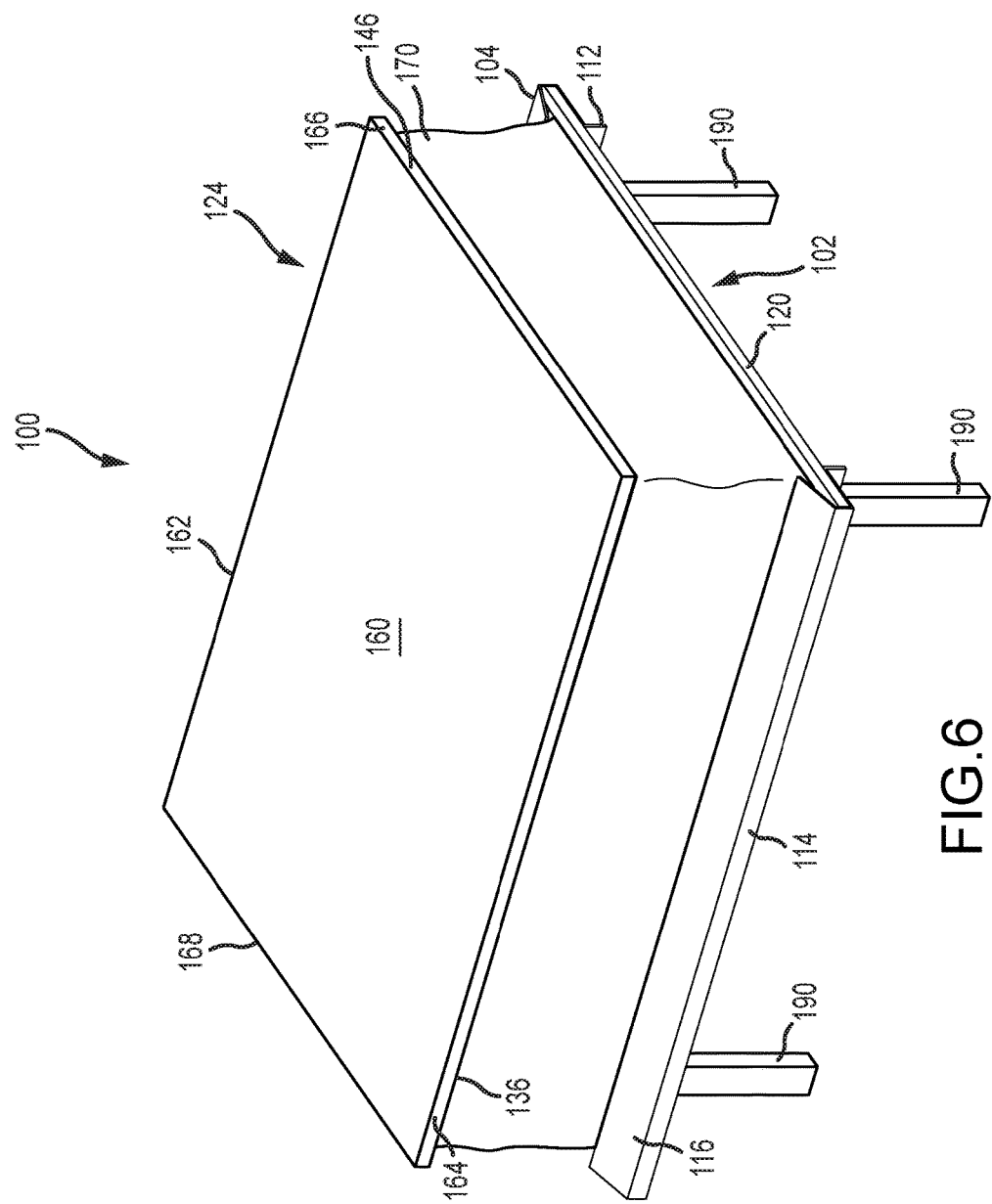
FIG. 6 is a front perspective view of the first embodiment system transitioning between the first position and a second position according to the present invention.
Figure 7A:
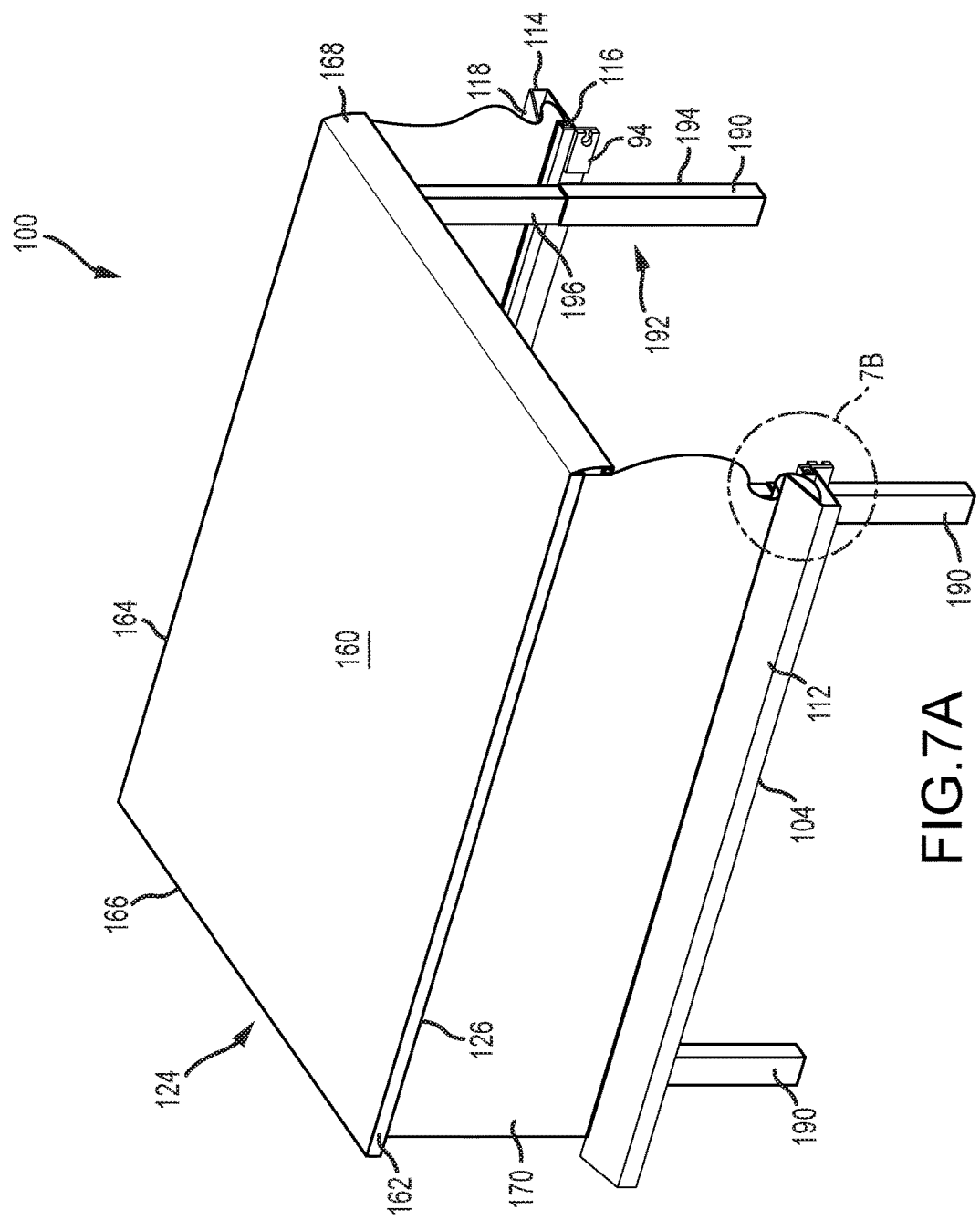
FIG. 7A is a rear perspective view of the first embodiment system shown in FIG. 6 according to the present invention.

The second frame 124 is more easily seen in FIGS. 6 and 7A. The second frame 124 preferably comprises a first cover member 126, a second cover member 136, a third cover member 146, and a fourth cover member 150 (see FIG. 4B). Looking to FIG. 5A for a more detailed view, the first cover member 126 is shown preferably comprising a first cover member retainer 128, a first cover member flange 130, and a first cover member plate 132 extending inward from the first cover member retainer 128. Hook-and-loop fastener material 30 is preferably provided along the first cover member flange 130. The first cover member plate 132 preferably has a shelf 134 extending the length thereof and a first cam member 80 with a surface 82 is preferably provided thereupon. The first cover member retainer 128 is preferably configured to retain a second end portion 176 of the second compliant member 170.

Figure 13:
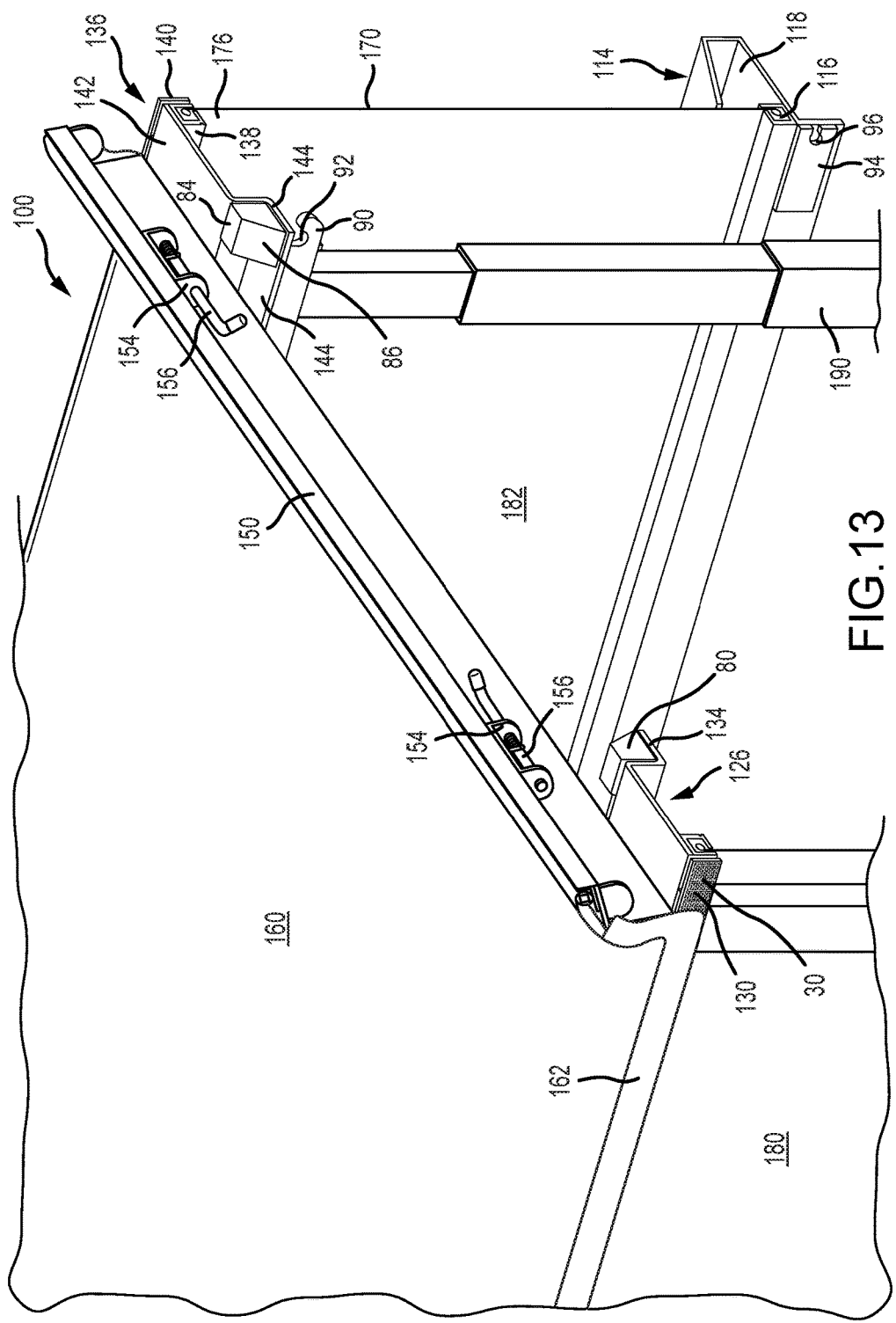
FIG. 13 is a partial rear perspective view of the first embodiment system according to the present invention.

As shown in FIG. 13, the second cover member 136 is similar to the first cover member 126 and comprises a second cover member retainer 138, a second cover member flange 140, and a second cover member plate 142 extending inward from the second cover member retainer 138. Hook-and-loop fastener material 30 is preferably provided along the second cover member flange 140 (see FIG. 14). The second cover member plate 142 preferably has a shelf 144 and a second cam member 82 with a surface 84 is preferably provided thereupon. The second cover member retainer 138 is preferably configured to retain the second end portion 176 of the second compliant member 170.

The third cover member 146 preferably comprises a third cover member retainer 148 and extends between the first and second cover members 126,136. The third cover member 146 is configured to retain the second end portion 176 of the second compliant member 170 and a third side 166 of the first compliant member 160 (discussed further below).

Figure 4A:
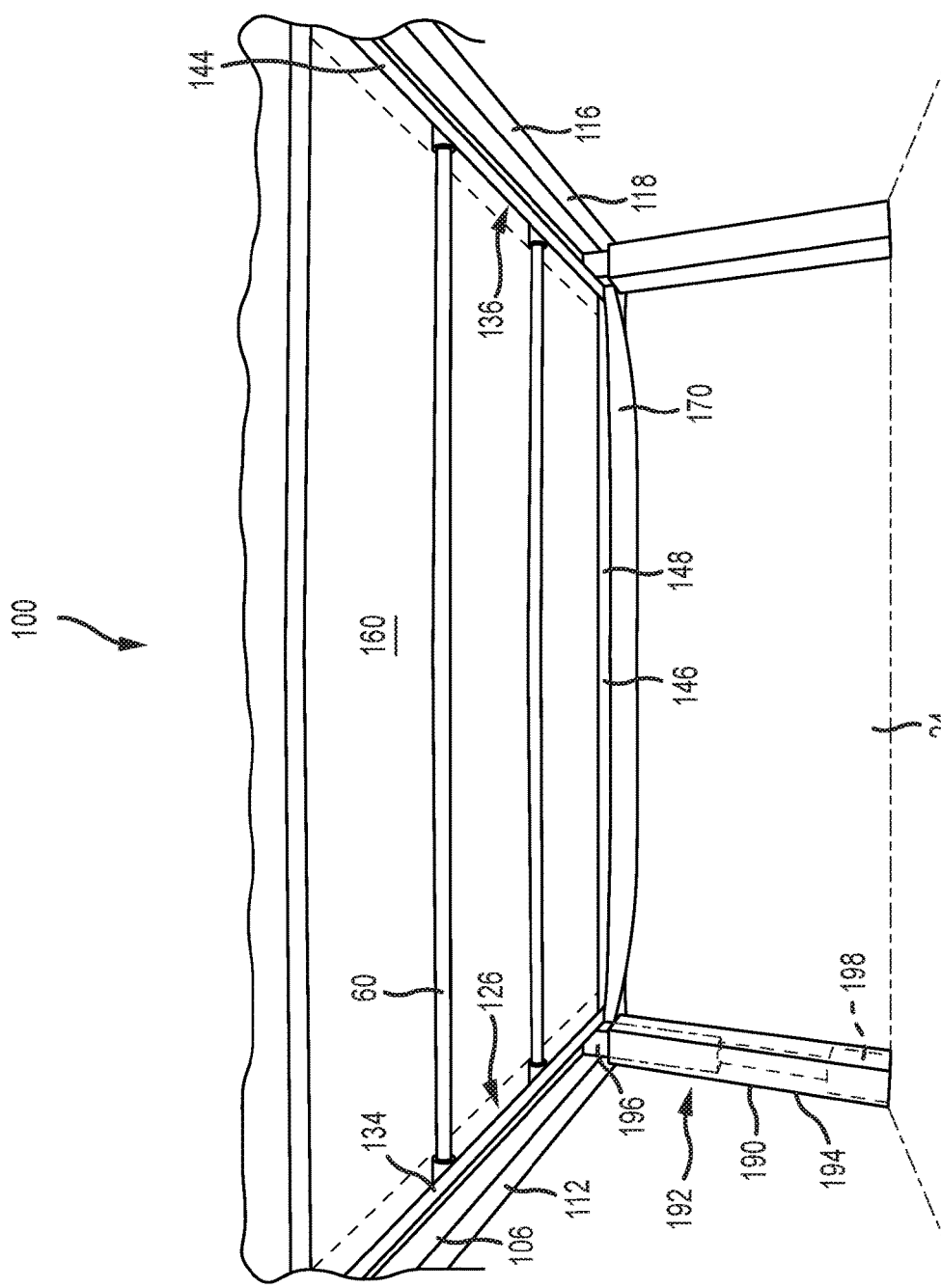
FIG. 4A is a partial bottom perspective view of the first embodiment system in the first position according to the present invention.
Figure 4B:
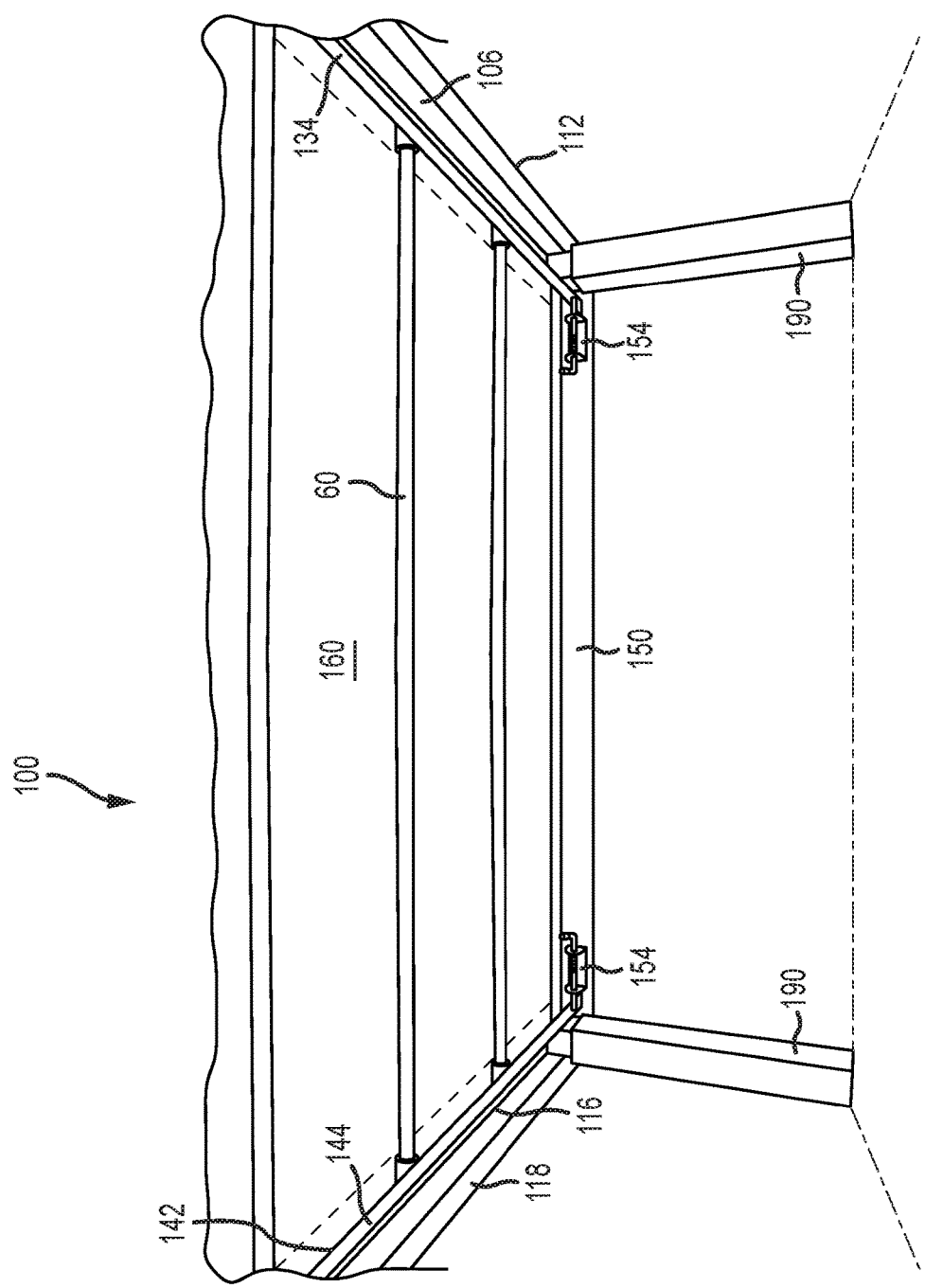
FIG. 4B is a partial rear perspective view of the first embodiment system in the first position according to the present invention.

Looking to FIG. 4B, the fourth cover member 150 is shown. The fourth cover member 150 preferably comprises a fourth cover member retainer 152 (see FIG. 2) and a pair of latches 154. The pair of latches 154 are configured to removably engage with the first and second cover members 126,136.

Figure 12:
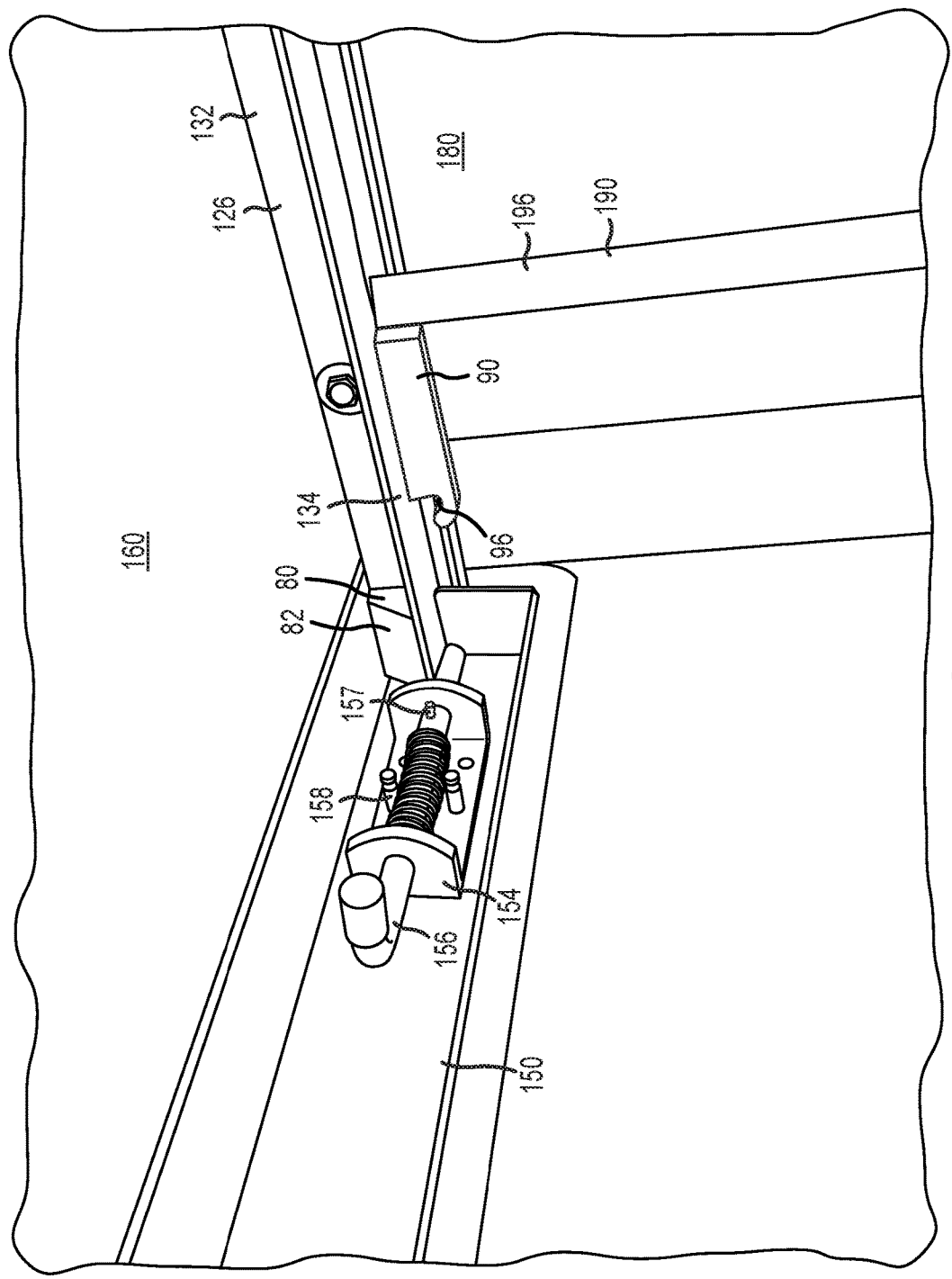
FIG. 12 is a close-up perspective view of a cover latch mechanism of the first embodiment system according to the present invention.

As shown in FIGS. 12 and 13, each of the latches 154 preferably has a spring-loaded rod 156 with a pin 157 configured to interface with the first and second cover member plates 132,142 of the respective first and second cover members 126,136 when in an engaged position. The interface with the first and second cover member plates 132,142 may be made through the respective first and second cam members 80,84. To disengage the fourth cover member 150 from the first and second cover members 126,136, the spring-loaded rods 156 are moved inward toward each other until clear of the first and second cover member plates 132,146 and potentially the first and second cam members 80,84, then the fourth cover member 150 is free to move relative to the first and second cover members 126,136. The spring-loaded rods 156 may be maintained in the disengaged position by placing the pin 157 against a catch 158.

To engage the fourth cover member 150 with the first and second cover members 126,136, the reverse of the disengaging procedure is performed; however, the spring-loaded rods 156 may be in the engaged position prior to engaging with the first and second cover members 126,136. In that case, during the process of lowering the fourth cover member 150 into position between the first and second cover members 126,136, each of the spring-loaded rods 156 will follow the surfaces 82,86 of the respective first and second cam members 80,84. Through the biased nature of the spring-loaded rods 156, the spring-loaded rods 156 will engage with the first and second cover member plates 132,142 when they are below the most inwardly extending portion of the first and second cam members 80,84.

Looking back to FIG. 5A, one method of securing the second compliant material 170 is shown with respect to the first rail member retainer 106 of the first rail member 104. The first end portion 172 of the second compliant material 170 is preferably fed into the first cover member retainer 106 through a slot 108 creating a loop 178 in the first end portion 172. Preferably, a dowel 50 is then inserted into the loop 178 along the length of the first rail member retainer 106. The diameter 52 of the dowel 50 is preferably greater than the width 110 of the slot 108, thereby retaining the first end portion 172 of the second compliant material 170 within the first rail member retainer 106. Clips (not shown) may further secure the free end 174 of the first end portion 172 of the second compliant member 170 to the first cover member retainer 106; however, as shown with respect to a second embodiment 200 of the cover system shown in FIG. 5B, the loop 178 may be formed by sewing (or otherwise attaching) the free end 174 back to the second compliant material. The same retention method is preferably provided for the second compliant material 170 within at least the second rail member 114, the third rail member 120, the first cover member 126, the second cover member 136, and the third cover member 146, and the first compliant material 160 within at least the fourth cover member 150.

The second frame 124 is preferably sized and configured to be positioned adjacent to and substantially over the first frame 102, whereby the first cover member 126, the second cover member 136, and the third cover member 146 of the second frame 124 are positioned substantially directly above the first rail member 104, the second rail member 114, and the third rail member 120 of the first frame 102, respectively, when the truck box cover system 100 is in the first position (see FIGS. 1, 2, and 5).

Additionally, as depicted in FIGS. 1-5, when in the first position, the second compliant material 170 along and between the first rail member 104 and the first cover member 126 is preferably substantially positioned within the first rail member enclosure 112 and the second compliant material 170 along and between the second rail member 114 and the second cover member 136 is preferably substantially positioned within the second rail member enclosure 118.

The second embodiment 200 of the cover system shown in FIG. 5B preferably comprises a first frame 202 with a first rail member 204 and a second frame 224 with first cover member 226. In the second embodiment 200, it should be understood that the second rail member (not shown) of the first frame 202 and the second cover member (not shown) of the second frame 224 are mirror images of the respective first rail member 204 and the first cover member 226. The first rail member 204 comprises a first rail member retainer 206 with a slot 208 and a first rail member enclosure 212. The first cover member 226 comprises a first cover retainer 228, a first cover member flange 230, and a first cover member plate 232 with a shelf 234. Preferably, a hook-and-loop fastener material 30 is provided on the inside surface of the first cover member flange 230.

The first compliant material 160 preferably comprises a first side 162, a second side 164, a third side 166, and a fourth side 168. The first and second sides 162,164 preferably comprise hook-and-loop fastener material (see FIG. 14) therealong and are configured to be removably attachable to the first and second cover member flanges 130,140 of the second frame 124, respectively. The third side 166 of the first compliant material 160 is preferably retained within the third cover member retainer 146 of the third cover member 146 and the fourth side 168 is preferably retained within the fourth cover member retainer 150 of the fourth cover member 150. The first compliant material 160 is shown as being removably attached by the hook-and-loop fastener material 30, however, additional or alternative fastening configurations, such as snaps, are contemplated.

Figure 11:
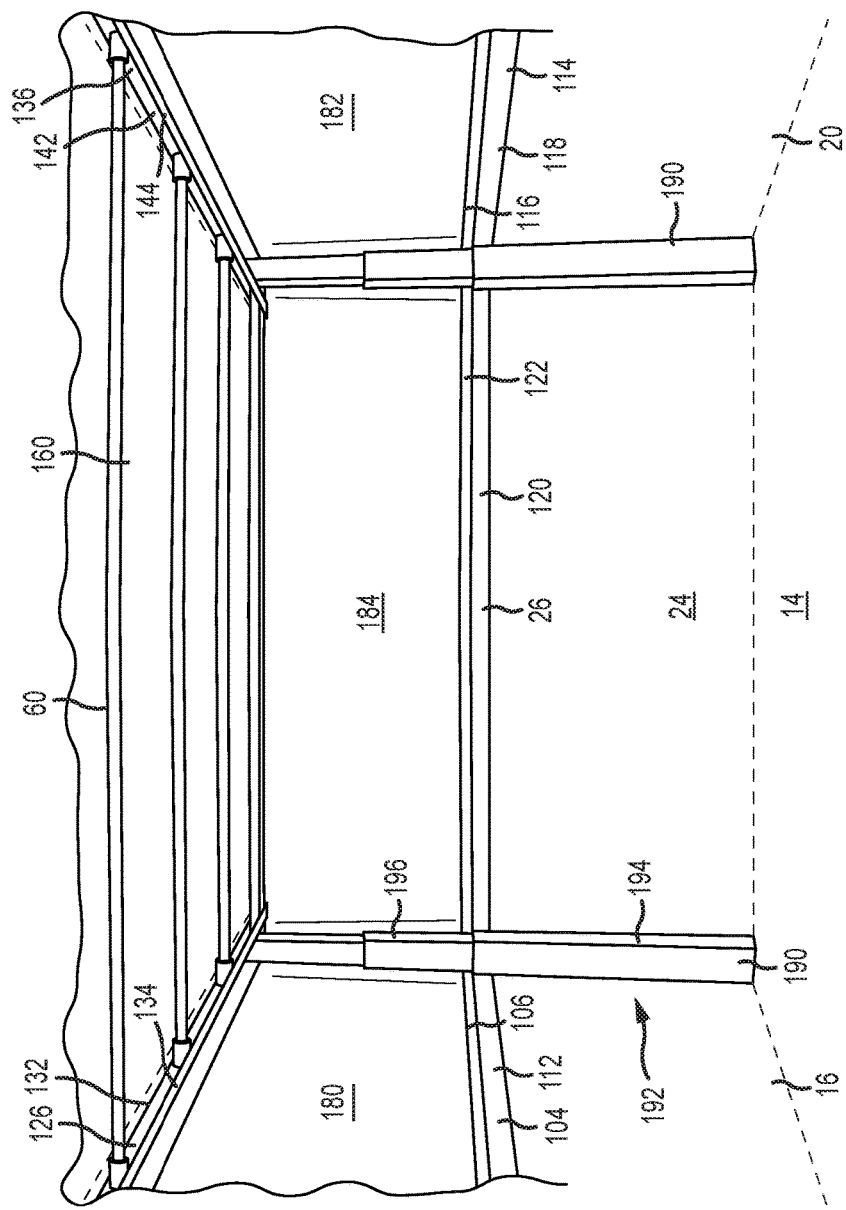
FIG. 11 is a partial rear perspective view of the first embodiment system in the second position according to the present invention.
Figure 14:
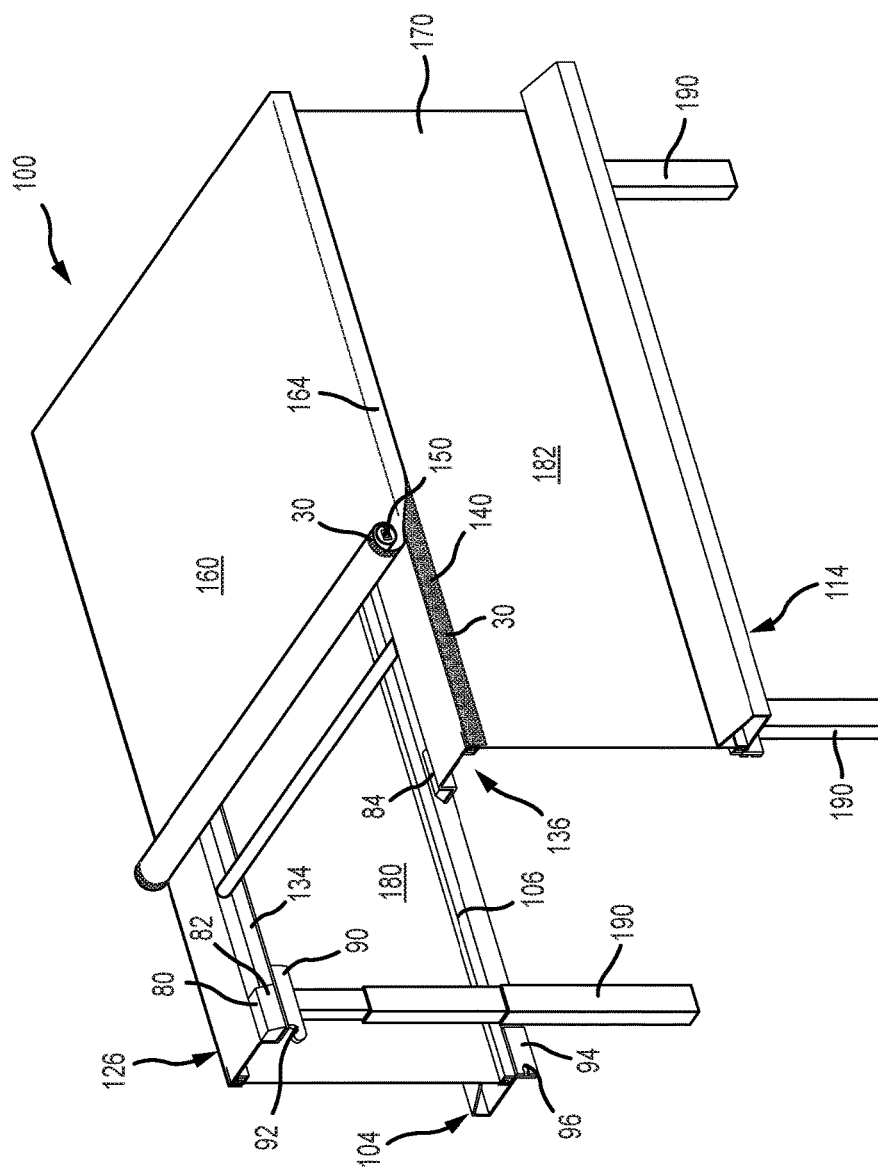
FIG. 14 is a rear perspective view of the first embodiment system in the second position according to the present invention.
Figure 15:
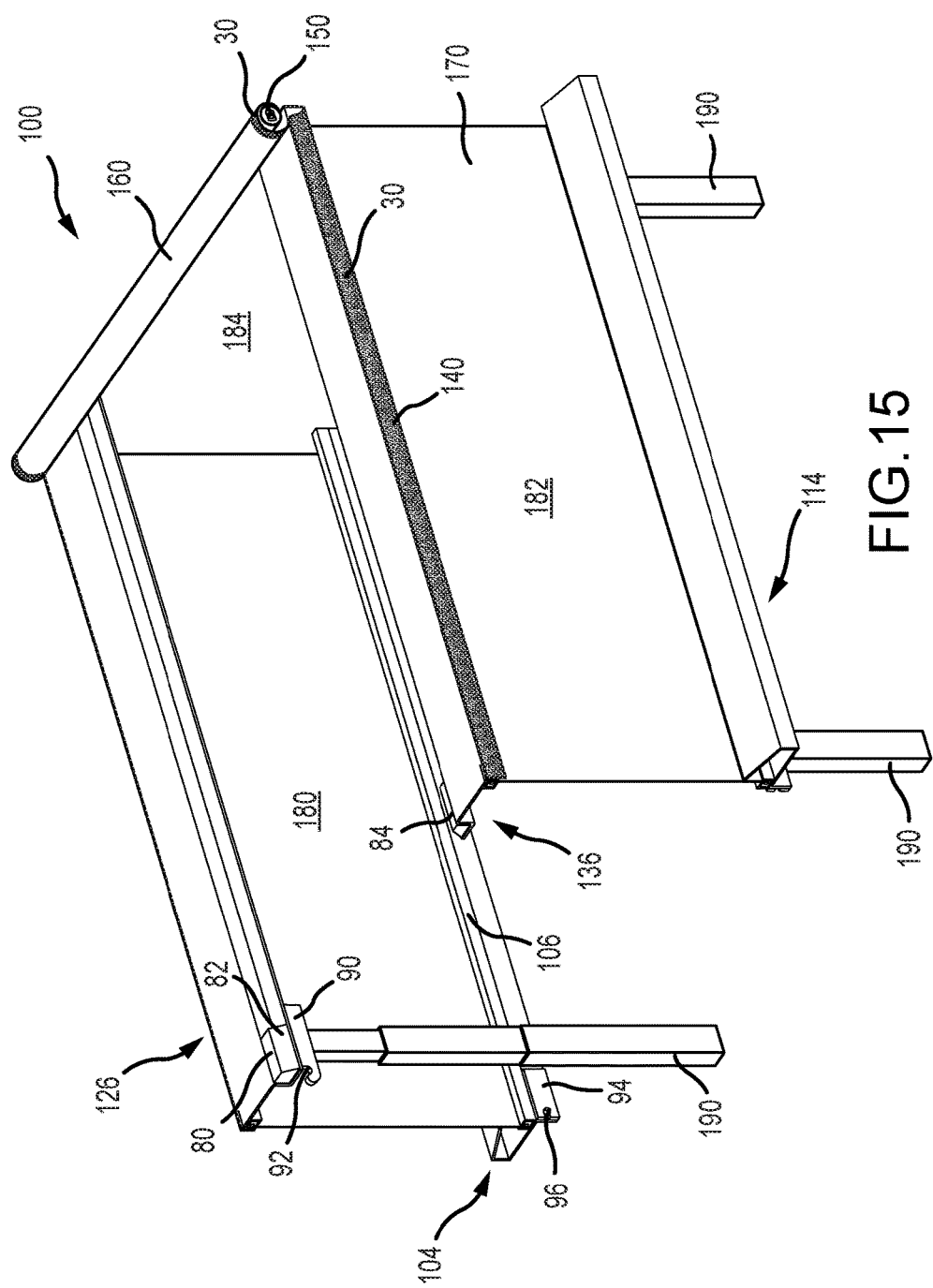
FIG. 15 is a rear perspective view of the first embodiment system in the second position according to the present invention.
Figure 16:
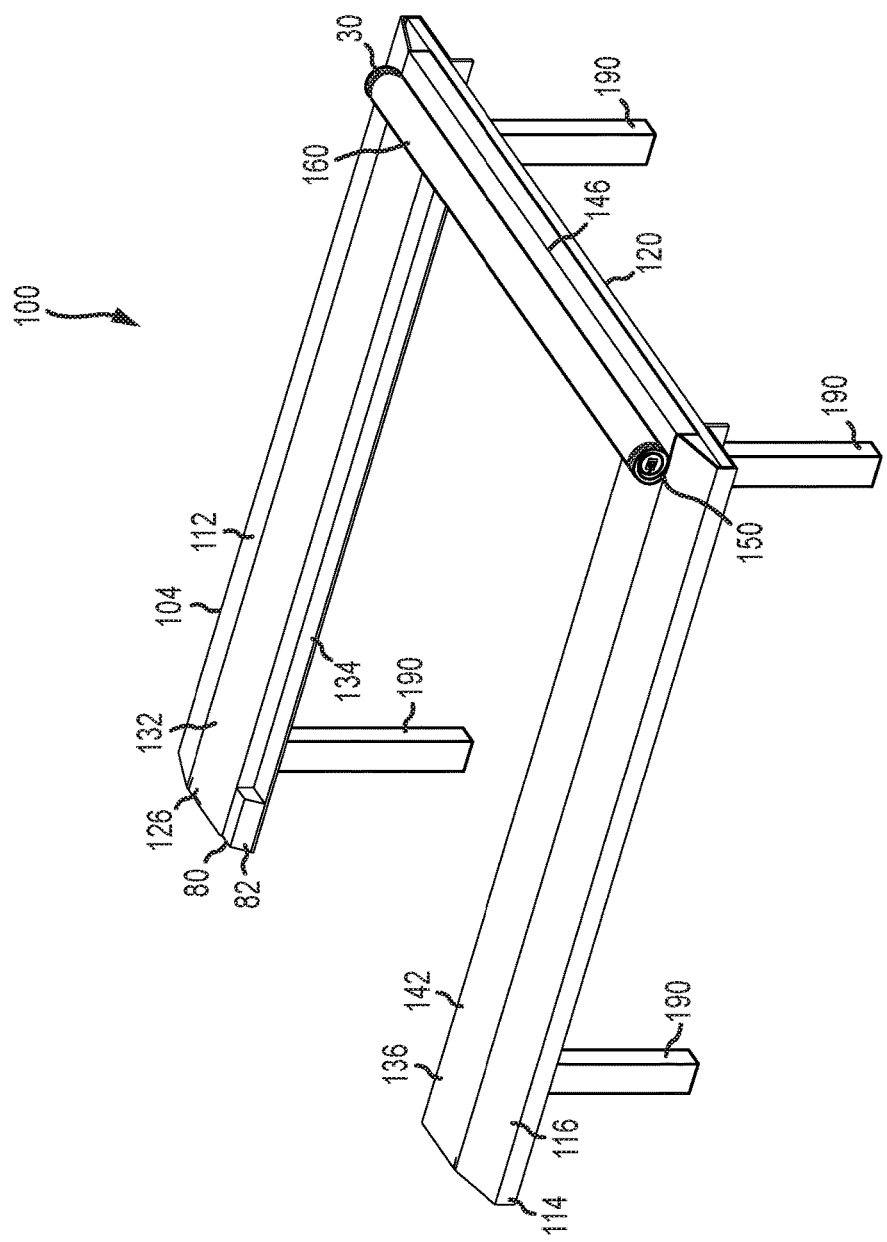
FIG. 16 is a front perspective view of the first embodiment system in the first position according to the present invention.

Looking at FIGS. 11 and 14, a plurality of removable cover supports 60 are shown. The plurality of cover supports 60 are preferably provided positioned on the shelves 134, 144 of the first and second cover members 126,136 and extend therebetween.

Each of the plurality of columns 190 preferably comprises a telescopic assembly 192 with a base 194, a telescopic portion 196 (see FIG. 11), and an actuator 198 (see FIG. 4A) preferably located within, or at least substantially within, the base 194 and configured to actively engage with the telescopic portion 196. The base 194 is preferably attached to at least one of the floor 14 of the truck box 12 and the first frame 102. The telescopic portions 196 are preferably attached to the second frame 124. Even more preferably, the telescopic portions 196 are attached to the first and second cover member plates 132,142 of as shown in FIG. 5A.

Figure 7B:
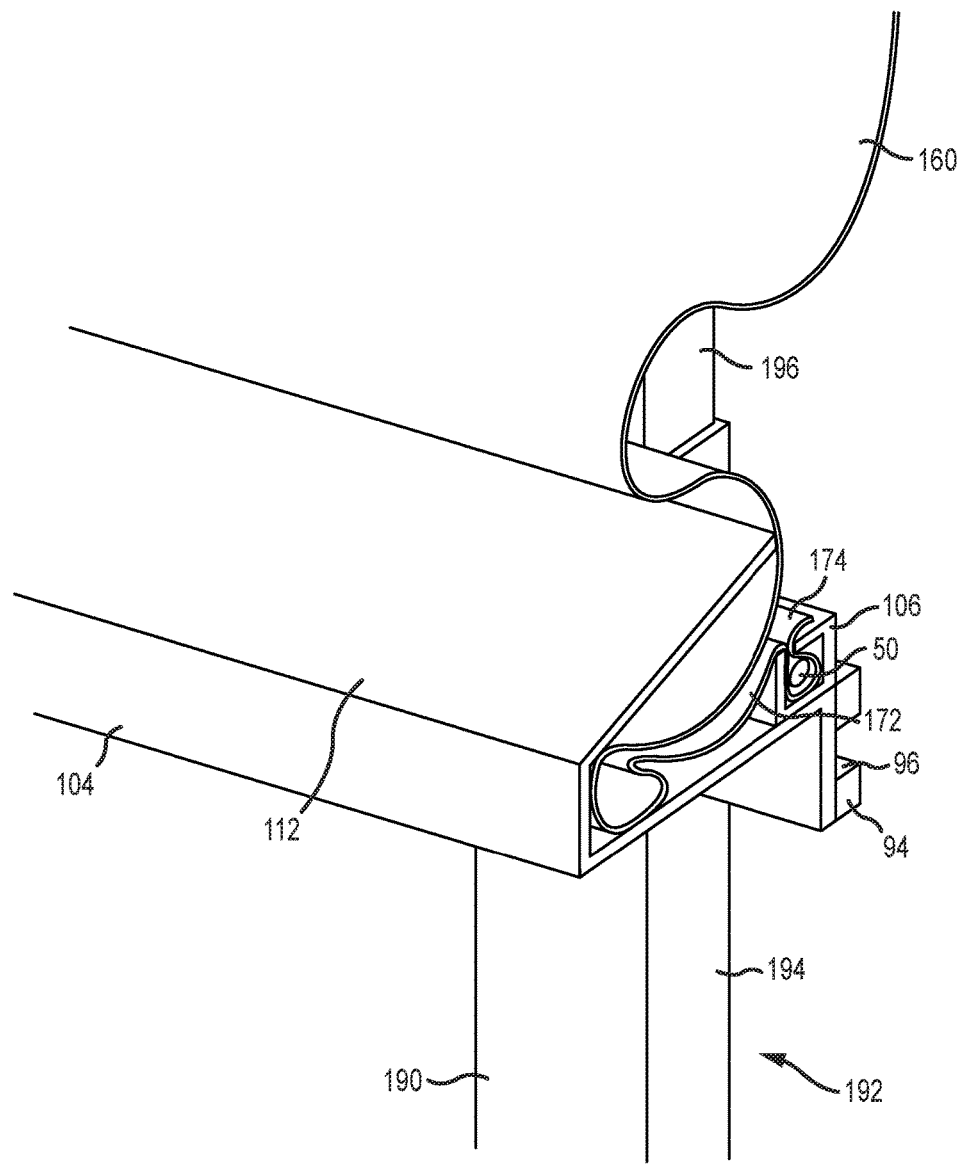
FIG. 7B is a partial rear perspective view of a rail member of the first embodiment system shown in FIG. 7A according to the present invention.
Figure 8:
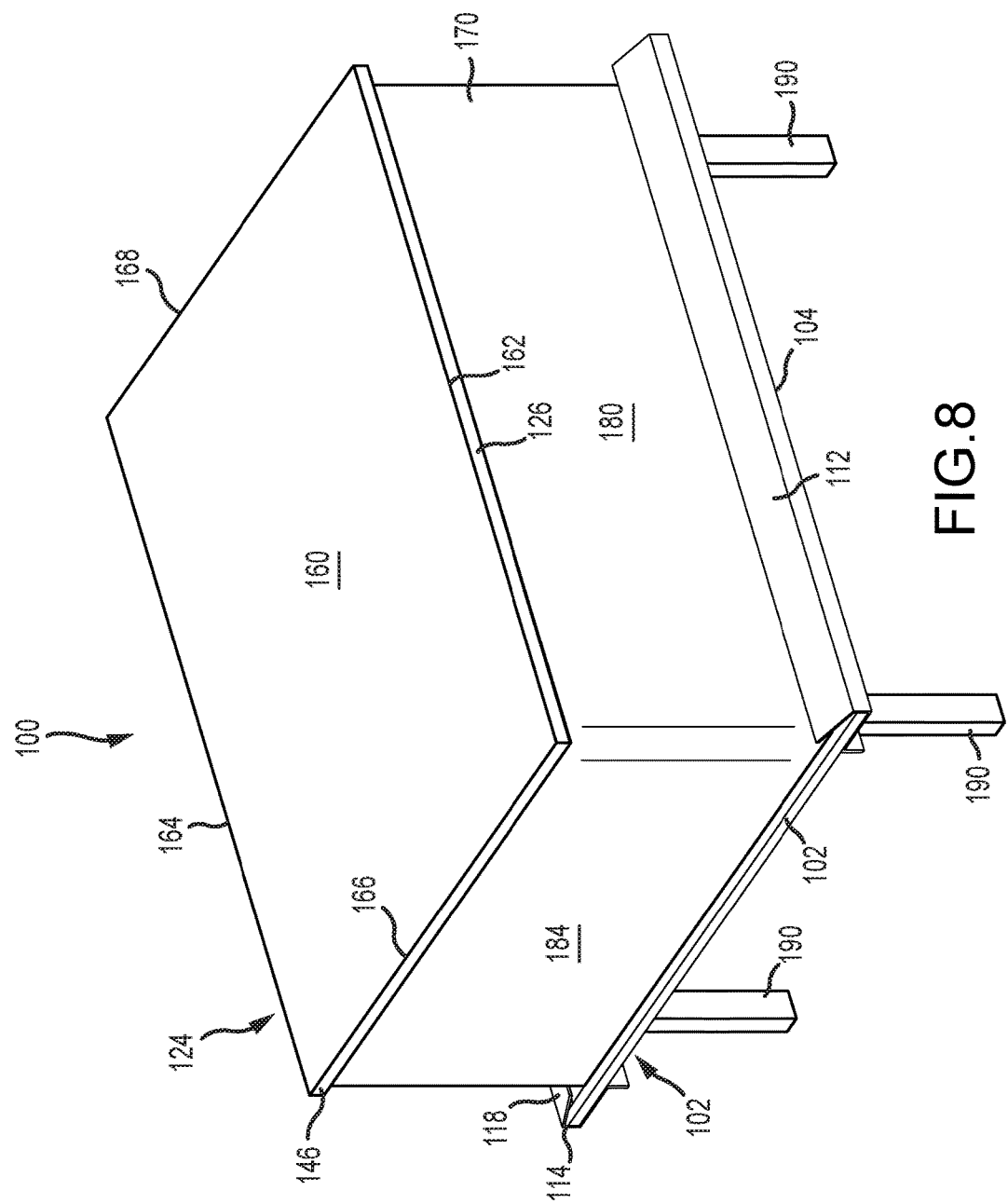
FIG. 8 is a front perspective view of the first embodiment system in the second position according to the present invention.
Figure 9:
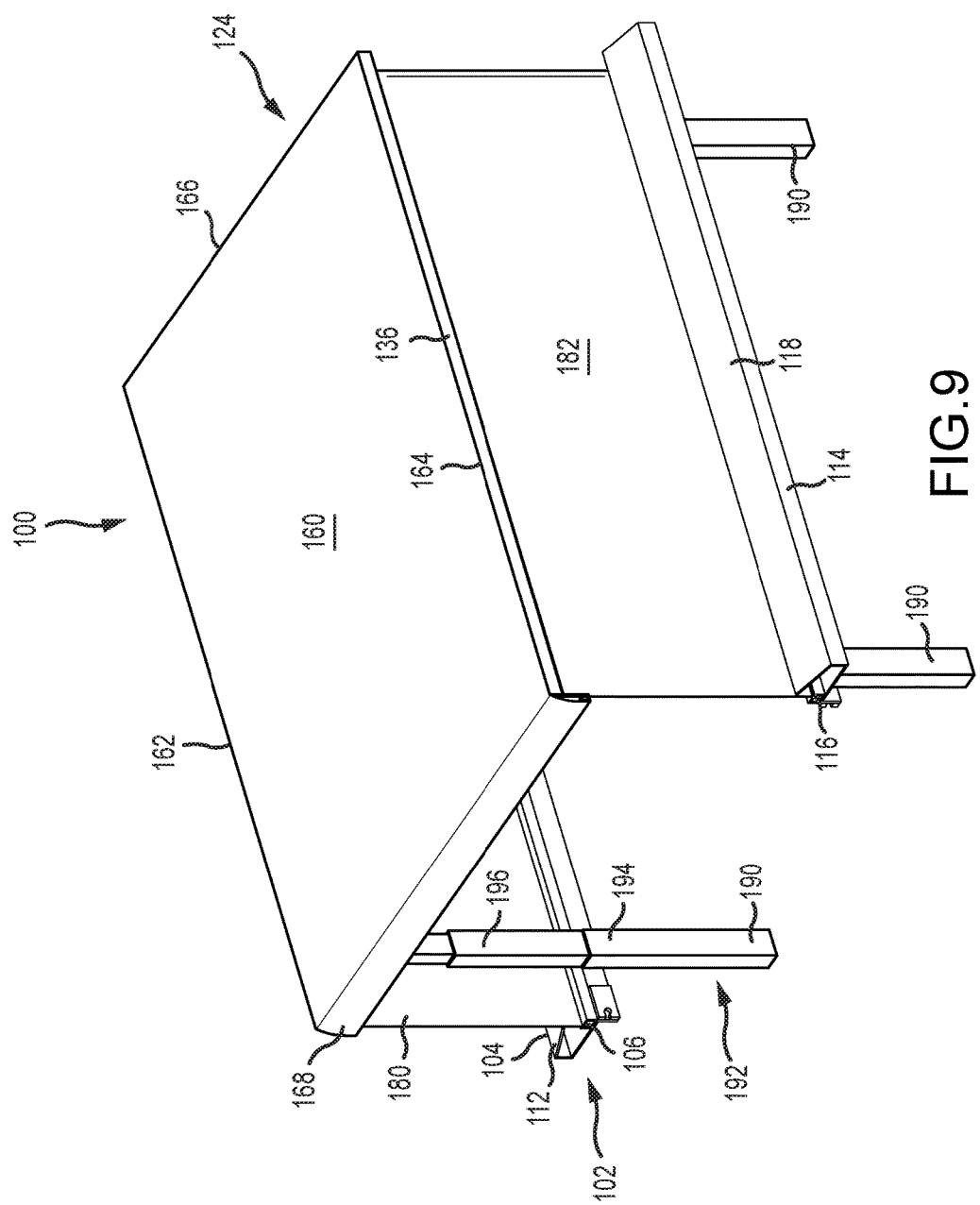
FIG. 9 is a rear perspective view of the first embodiment system in the second position according to the present invention.

Looking to FIGS. 6-7B, the cover system 100 is shown in an intermediate state as it is being raised from the first, lowered, position to a second, raised, position. Extension of the telescoping portions 196 is performed by activation of the actuators 198 through a switch (not shown) in electrical communication therewith. The switch (not shown) is preferably operated through a remote (not shown). Upon activation, the second frame 124 is raised relative to the first frame 102. As shown in FIGS. 7A and 7B, the second compliant material 170 is unfurled from the first and second rail member enclosures 112,118. The second compliant material 170 is preferably a continuous un-interrupted piece of material and made from a pliable and weather-resistant material such as a stretch tent textile.

The second frame 124 continues the upward assent until reaching the second position shown in FIGS. 8-11. In the second position, the second compliant member 170 is preferably made taught between the first frame 102 and the second frame 124 and provides a first wall 180, a second wall 182, and a third wall 184.

To return the second frame 124 to the first position, the actuators 198 are activated by the switch (not shown) in the reverse direction.

The actuators 198 are preferably hydraulically driven but a pneumatic system is also within the purview of the present invention. Activation of the actuators 198 to extend the telescoping portions 196 is preferably a one-touch activation, whereas the retraction of the telescoping portions 196 to lower the second frame 124 from the second position to the first position preferably requires constant activation of the switch (not shown) by a user (not shown). This is done to reduce the chance of user injury, damage to the cover 100, and/or the load (not shown) being carried in the truck box 12 by accidental activation; however, this functionality should not be viewed as limiting the invention. Additionally, or alternatively, a manually operated switch (not shown) may be included which must be manually closed prior to activation of the actuators 198.

Figure 17:
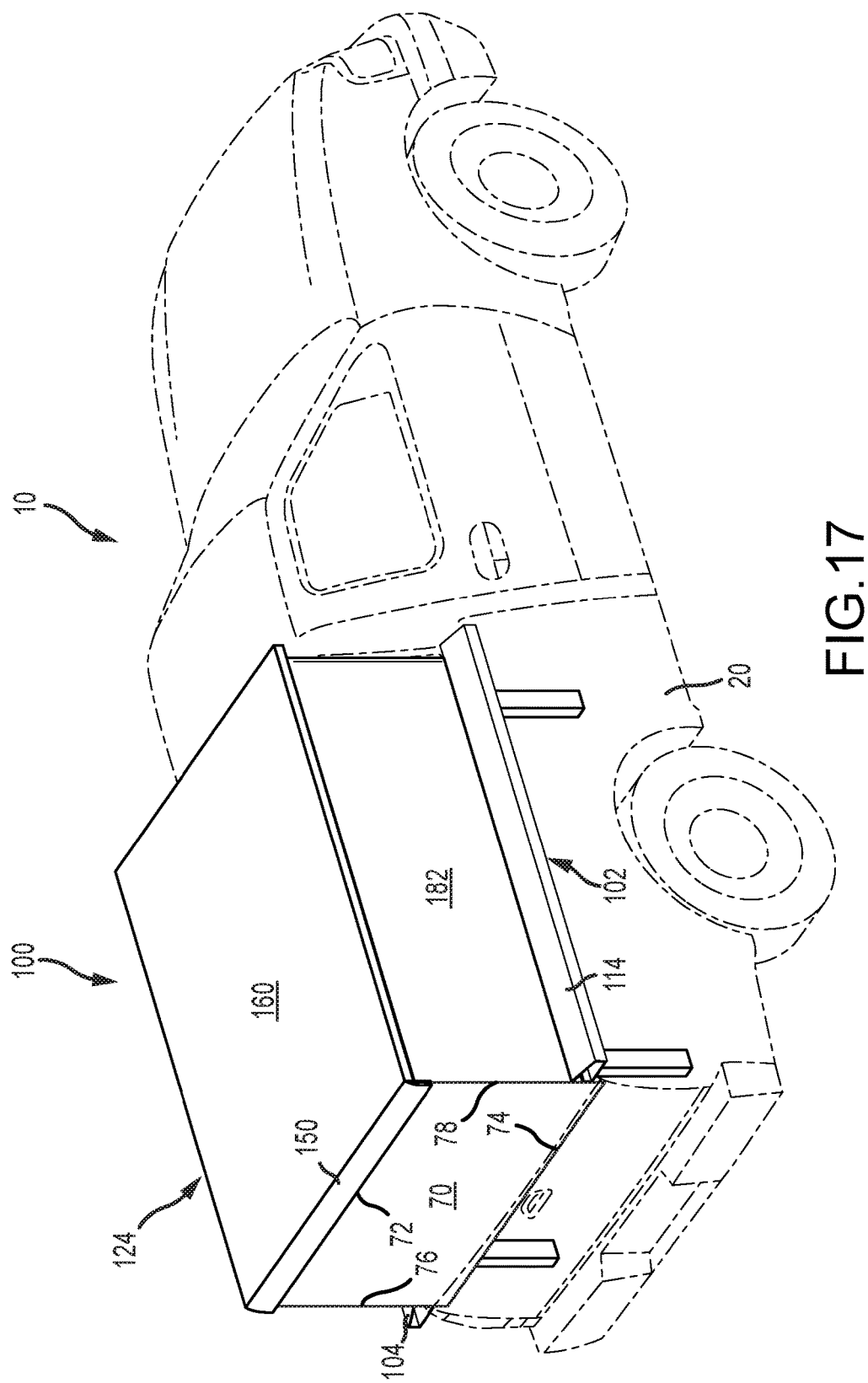
FIG. 17 is a perspective view of the first embodiment of the present invention.

Turning now to FIG. 17 in which the rear panel 70 is shown as installed. The rear panel 70 preferably comprises a first rod (hidden) provided along a first side 72 and a second rod (hidden) provided along a second side 74, a third side 76, and a fourth side 78. With reference to FIG. 13, the first rod (hidden) is receivable within the recesses 92 of a pair of upper brackets 90 attached to the first and second cover members 126,136 and the second rod (hidden) is receivable within the recesses 96 of a pair of lower brackets 94 attached to the first and second rail members 104,114. The third and fourth sides 76,78 are preferably configured to be secured in a weatherproof manner to the second compliant member 170. The weatherproof connection may be made through hook-and-loop material or any other method now known or later developed. The rear panel 70 is preferably formed from a compliant material, such as a stretch tent textile, and is configured to be rolled up and stored when not in use.

Turning now to FIGS. 18-21 a rack system 300 according to the present invention is shown. The rack system 300 is preferably configured to interface with the cover system 100,200. The rack system 300 comprises a plurality of upstanding members 302 and a plurality of cross-members 320.

Figure 21:
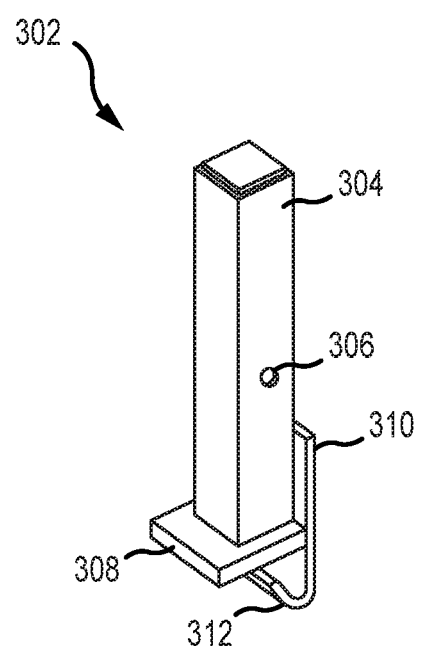
FIG. 21 is a perspective view of an upstanding member of the rack system according to the present invention.

FIG. 21 provides a view of an exemplary embodiment of an upstanding member 302 according to the present invention. The upstanding member 302 preferably comprises a pillar 304, with a through-hole 306, extending from a base 308, and an arm 310 extending alongside at least a portion of the pillar 304 and below the base 308. The arm 310 has an upturned end 312.

Figure 18:
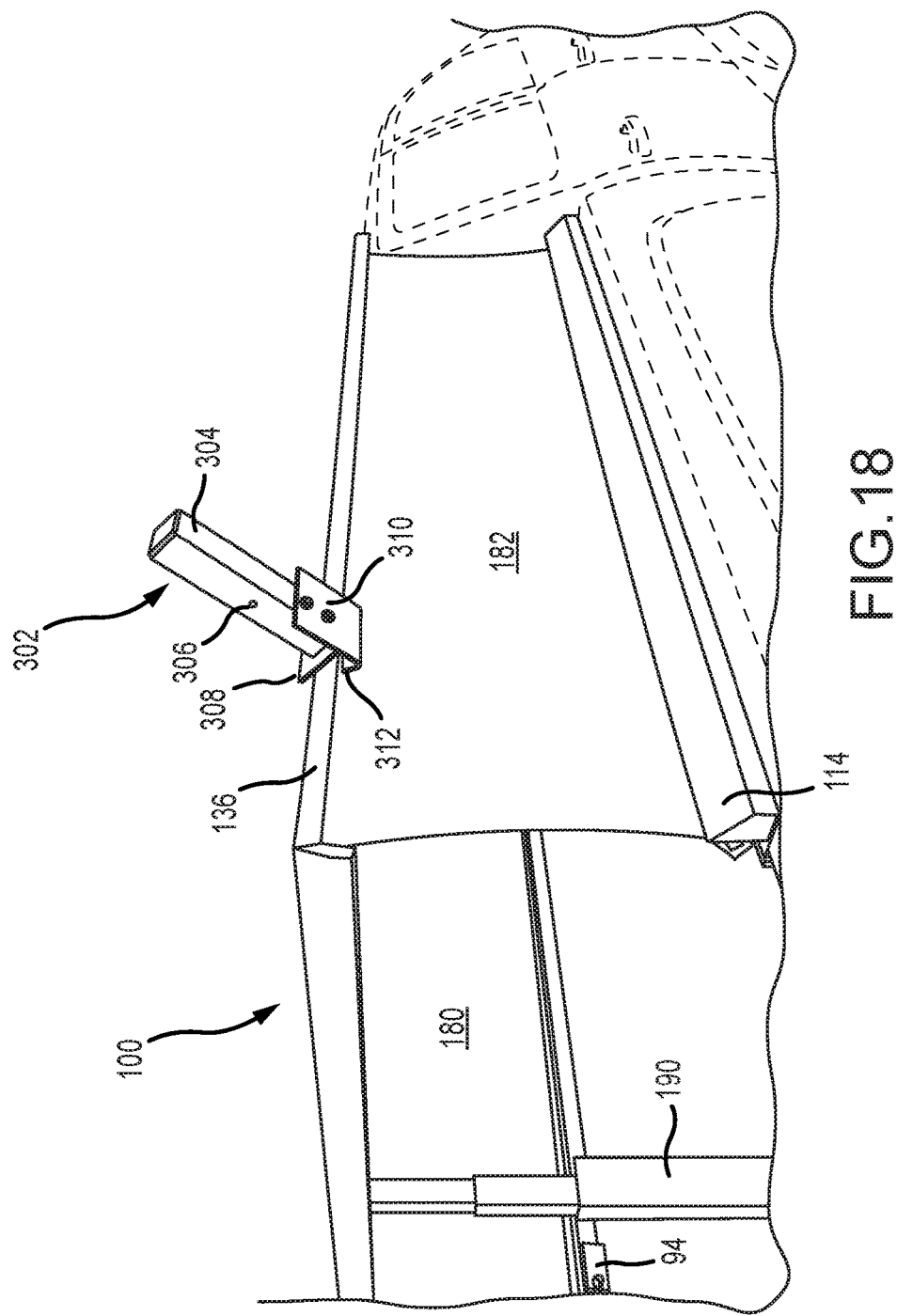
FIG. 18 is a perspective view of the first embodiment with a rack system according of the present invention.
Figure 19:
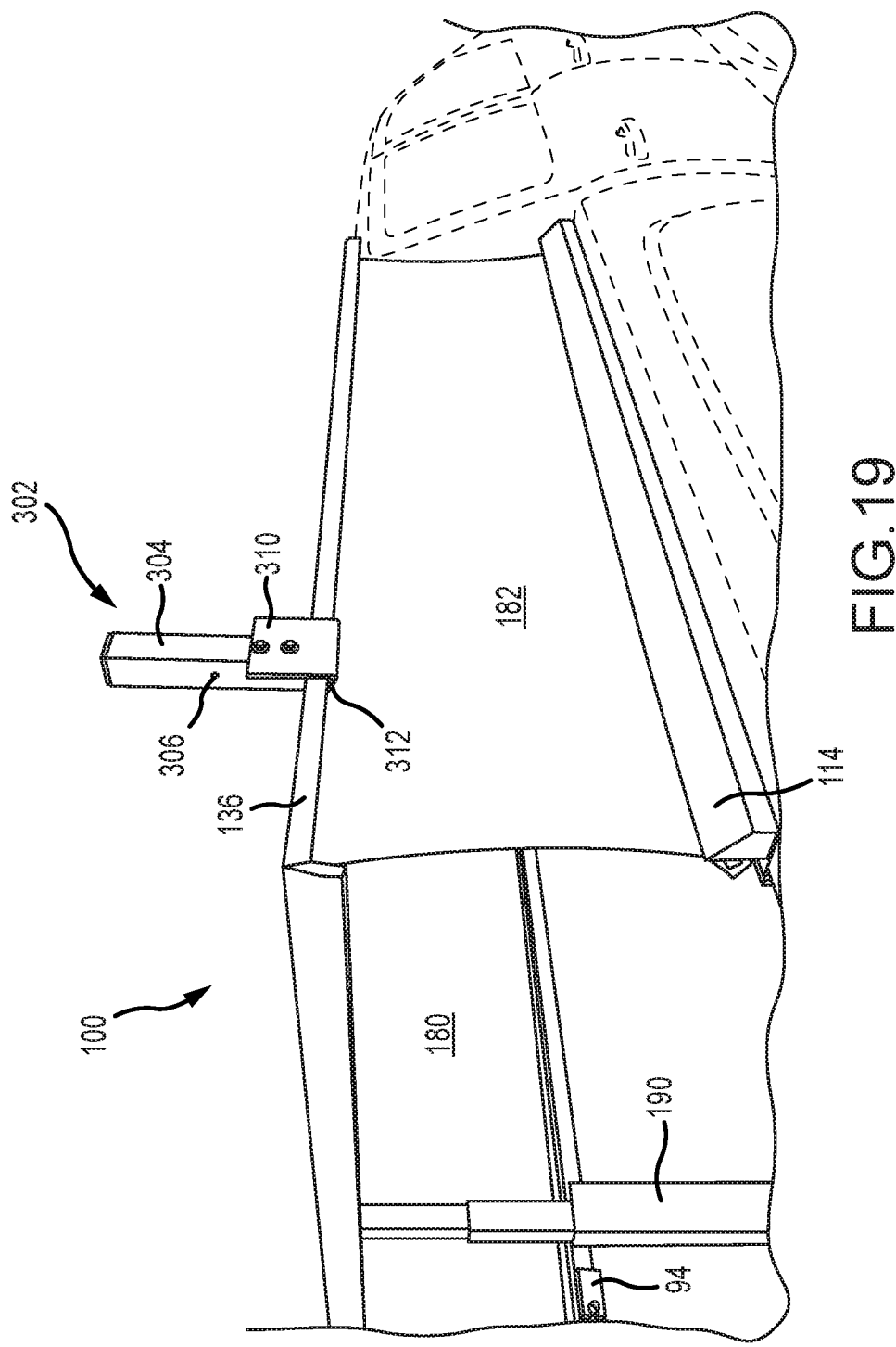
FIG. 19 is a perspective view of the first embodiment with the rack system according of the present invention.

Each upstanding member 302 is configured to interface with the first and second cover members 126,136. As shown in FIGS. 18 and 19 with respect to placement of an upstanding member 302 on the second cover member 136, the upstanding member 302 is positioned with the upturned end 312 received within the second cover member 136 between the second cover member retainer 138 and the second cover member flange 140 with the remainder of the arm 310 that is below the base 308 abutting the outside of the second cover member flange 140. The base 308 is positioned atop the second cover member 136. This arrangement allows for increased versatility as the plurality of upstanding members 302 may be placed at any location along the first and second cover members 126,136.

Figure 20:
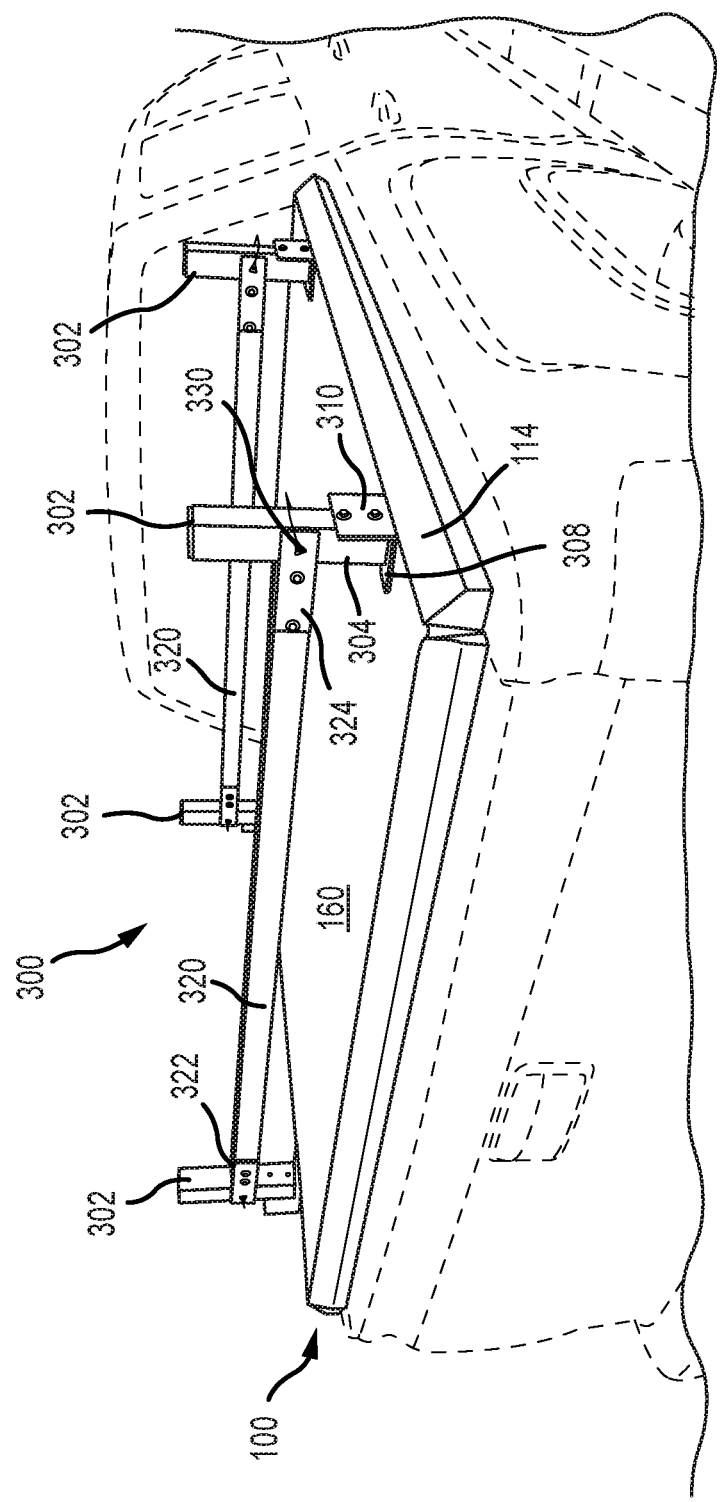
FIG. 20 perspective view of the first embodiment with the rack system according of the present invention.

FIG. 20 illustrates the plurality of cross-members 320 attached to and extending between opposing upstanding members 302. Here, the plurality of cross-members 320 have through-holes (hidden) at opposing end portions 322, 324 which are configured to be alignable with the through-holes 306 of the pillars 304. The plurality of cross-members 320 are preferably removably attached to the upstanding members 302 with pins 330 extending through the aligned upstanding member through-hole 306 and the cross-member through-hole (hidden), however, other methods of removable attachment are contemplated, such as by a threaded fastener (not shown). It should also be noted that the placement of the plurality of cross-members 320 on the plurality of upstanding members 302 may be adjustable.

The rack system 300 is configured to be incorporated and usable with both cover system 100,200 in both the first position and the second position. FIGS. 18-20 illustrate thus with the cover system 100.

A method for raising and lowering a truck box cover is also contemplated according to the present invention and is describes with respect to the first embodiment of the truck box cover assembly 100. The method preferably comprises the steps of: providing a first frame 102 and a second frame 124; providing a plurality of telescopic assemblies 192 operably connected to the first frame 102 and the second frame 124, whereby the second frame 124 is configured to be movable relative to the first frame 102 through activation of the plurality of telescopic assemblies 192 between two positions: a first position and a second position; whereby in the first position the first frame 102 and the second frame 124 are juxtaposed and in the second position the first frame 102 and the second frame 124 are spaced apart; providing a first compliant member 160 supported by and extending across the second frame 124; providing a second compliant material 170 supported by and extending between the first frame 102 and the second frame 124; whereby, when in the first position, activating the plurality of telescoping assemblies 192 to move the second frame 124 to the second position wherein the second compliant material 170 is taut; and whereby when in the second position, activating the plurality of telescoping assemblies 192 to move the second frame 124 to the first position. The method further comprises the step of actively monitoring the truck box cover system 100 when moving from the second position to the first position. Active monitoring may include, but should not be limited to, constantly maintained activation of the plurality of telescopic assemblies 192 by a user (not shown) and/or pressure sensors (not shown) monitoring force applied in a direction different than the downward movement of the second frame 124. The method may further comprise the step of tucking the second compliant member 170 into a first rail member retainer 112 and a second rail member enclosure 118 of the first frame 102 when moving the second frame 124 from the second position to the first position.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A truck box cover system comprising:
   a first frame comprising a first rail member enclosure and a second rail member enclosure;
   a second frame;
   a plurality of telescopic assemblies operatively connected to the first frame and the second frame, and configured to move the second frame relative to the first frame between a first position and a second position;
   a top supported by the second frame; and
   a compliant material supported by and extending from the first frame to the second frame;
   whereby in the first position the first frame and the second frame are juxtaposed and the compliant member is substantially retained within the first rail member enclosure and the second rail member enclosure; and
   whereby in the second position the first frame and the second frame are spaced apart and the compliant member defines a first wall, a second wall, and a third wall.

2. The truck box cover system of claim 1, wherein the first frame is configured to be attached to a truck box.

3. The truck box cover system of claim 1, whereby the compliant member comprises weatherproof material.

4. The truck box cover system of claim 3, wherein the compliant member comprises a stretch tent textile.

5. The truck box cover system of claim 1, wherein the plurality of telescopic assemblies is configured to be operated electrically.

6. The truck box cover system of claim 5, whereby the plurality of telescopic assemblies is configured to be operated remotely.

7. A truck box cover system comprising:
a top movable between a first position and a second position;
a first rail member enclosure;
a second rail member enclosure;
a plurality of telescopic assemblies operatively connected to the top and configured to move the top between the first position and the second position; and
a compliant material extending between the top and the first and second rail member enclosures;
the compliant material substantially retained within the first and second rail member enclosures in the first position; and
the compliant member defining a first wall, a second wall, and a third wall in the second position.

8. The truck box cover system of claim 7, whereby the compliant member comprises weatherproof material.

9. The truck box cover system of claim 8, wherein the compliant member comprises a stretch tent textile.

10. The truck box cover system of claim 7, wherein the plurality of telescopic assemblies is configured to be operated electrically.

11. The truck box cover system of claim 10, whereby the plurality of telescopic assemblies is configured to be operated remotely.

* * * * *